United States Patent
Cruickshank et al.

(10) Patent No.: US 11,804,642 B2
(45) Date of Patent: Oct. 31, 2023

(54) INTEGRATED MICROSTRIP AND SUBSTRATE INTEGRATED WAVEGUIDE CIRCULATORS/ISOLATORS FORMED WITH CO-FIRED MAGNETIC-DIELECTRIC COMPOSITES

(71) Applicant: SKYWORKS SOLUTIONS, INC., Irvine, CA (US)

(72) Inventors: David Bowie Cruickshank, Rockville, MD (US); David Martin Firor, Thurmont, MD (US); Iain Alexander MacFarlane, Insch (GB)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/839,363

(22) Filed: Jun. 13, 2022

(65) Prior Publication Data
US 2023/0008079 A1    Jan. 12, 2023

Related U.S. Application Data

(60) Continuation of application No. 16/915,829, filed on Jun. 29, 2020, now Pat. No. 11,387,532, which is a
(Continued)

(51) Int. Cl.
*H01P 1/387* (2006.01)
*H01P 3/12* (2006.01)
(Continued)

(52) U.S. Cl.
CPC .............. *H01P 3/121* (2013.01); *H01P 1/36* (2013.01); *H01P 1/38* (2013.01); *H01P 1/387* (2013.01);
(Continued)

(58) Field of Classification Search
CPC ...... H01P 1/32; H01P 1/36; H01P 1/38; H01P 1/387; H01P 11/003; H01P 11/001
(Continued)

(56) References Cited

U.S. PATENT DOCUMENTS

| | | | |
|---|---|---|---|
| 3,781,704 | A | 12/1973 | De Gruyl |
| 3,851,279 | A | 11/1974 | Andrikian |

(Continued)

FOREIGN PATENT DOCUMENTS

| | | |
|---|---|---|
| CN | 101910088 | 12/2010 |
| CN | 101981753 A | 2/2011 |

(Continued)

OTHER PUBLICATIONS

Zaspalis, V.T. et al., "Materials for inductive and microwave function integration in LTCC-technology multichip modules", Journal of Physics: Conference Series, vol. 10, 2005, pp. 357-360.
(Continued)

*Primary Examiner* — Stephen E. Jones
(74) *Attorney, Agent, or Firm* — Knobbe, Martens, Olson & Bear, LLP

(57) ABSTRACT

Disclosed are embodiments of microstrip and substrate integrated waveguide circulators/isolators which can be integrated with a substrate. This composite structure can serve as a platform for other components, allowing for improved miniaturization of components. Embodiments of the disclosure can be particular advantageous in the high frequency ranges, such as above 1.8 GHz or above 3 GHz, which allows devices to be used in the 5G space.

20 Claims, 23 Drawing Sheets

Related U.S. Application Data division of application No. 15/807,914, filed on Nov. 9, 2017, now abandoned.

(60) Provisional application No. 62/506,958, filed on May 16, 2017, provisional application No. 62/421,786, filed on Nov. 14, 2016.

(51) Int. Cl.

| | | |
|---|---|---|
| H01P 3/08 | (2006.01) | |
| H01P 3/16 | (2006.01) | |
| H04B 1/00 | (2006.01) | |
| H04B 1/04 | (2006.01) | |
| H01P 1/38 | (2006.01) | |
| H01P 1/36 | (2006.01) | |

(52) U.S. Cl.
CPC ............... *H01P 3/085* (2013.01); *H01P 3/16* (2013.01); *H04B 1/00* (2013.01); *H04B 1/0057* (2013.01); *H04B 1/04* (2013.01); *H04B 2001/0408* (2013.01)

(58) Field of Classification Search
USPC .................................................. 333/1.1, 24.2
See application file for complete search history.

(56) References Cited

U.S. PATENT DOCUMENTS

| | | |
|---|---|---|
| 4,122,418 A | 10/1978 | Nagao |
| H470 H | 5/1988 | Stern et al. |
| 5,051,869 A | 9/1991 | Goldfarb |
| 5,058,265 A | 10/1991 | Goldfarb |
| 5,096,878 A | 3/1992 | Hoshino et al. |
| 5,896,563 A | 4/1999 | Kawanami et al. |
| 5,959,059 A | 9/1999 | Vedula et al. |
| 6,504,444 B1 | 1/2003 | Furuya et al. |
| 6,611,180 B1 | 8/2003 | Puzella et al. |
| 6,646,515 B2 | 11/2003 | Jun et al. |
| 6,842,140 B2 | 1/2005 | Killen et al. |
| 6,844,789 B2 | 1/2005 | Lombardi et al. |
| 6,938,443 B1 | 9/2005 | Fabian |
| 7,132,381 B1 | 11/2006 | Oh et al. |
| 7,242,264 B1 | 7/2007 | How |
| 7,256,661 B2 | 8/2007 | Chen et al. |
| 7,368,998 B2 | 5/2008 | Abe et al. |
| 7,681,069 B1 | 3/2010 | Chellappa et al. |
| 7,687,014 B2 | 3/2010 | Zheng et al. |
| 7,941,404 B2 | 5/2011 | Garimella et al. |
| 8,282,763 B2 | 10/2012 | Cruickshank et al. |
| 8,514,031 B2 | 8/2013 | Popelka et al. |
| 8,696,925 B2 | 4/2014 | Cruickshank et al. |
| 8,891,596 B2 | 11/2014 | Hayafuji et al. |
| 9,214,712 B2 | 12/2015 | Cruickshank et al. |
| 9,263,175 B2 | 2/2016 | Cruickshank et al. |
| 9,527,776 B2 | 12/2016 | Cruickshank et al. |
| 9,640,849 B2 | 5/2017 | Cruickshank et al. |
| 9,711,835 B2 | 7/2017 | Cruickshank et al. |
| 9,771,304 B2 | 9/2017 | Cruickshank et al. |
| 9,935,351 B2 | 4/2018 | Cruickshank |
| 10,181,632 B2 | 1/2019 | Cruickshank et al. |
| 10,370,299 B2 | 8/2019 | Cruickshank et al. |
| 10,483,619 B2 | 11/2019 | Hill et al. |
| 10,581,134 B2 | 3/2020 | Cruickshank |
| 10,766,786 B2 | 9/2020 | Chen et al. |
| 10,773,972 B2 | 9/2020 | Cruickshank et al. |
| 10,860,432 B2 | 12/2020 | Wolfe |
| 10,929,027 B2 | 2/2021 | Kottomtharayil et al. |
| 11,081,770 B2 | 8/2021 | Hill et al. |
| 11,155,478 B2 | 10/2021 | Greulich et al. |
| 11,387,532 B2 | 7/2022 | Cruickshank et al. |
| 11,565,976 B2 | 1/2023 | Hill et al. |
| 11,603,333 B2 | 3/2023 | Hill et al. |
| 2003/0126247 A1 | 7/2003 | Strasser et al. |
| 2005/0034633 A1 | 2/2005 | Lai |
| 2005/0040908 A1 | 2/2005 | Mazzochette et al. |
| 2010/0279847 A1 | 11/2010 | Shimada et al. |
| 2018/0166763 A1 | 6/2018 | Cruickshank et al. |
| 2018/0330854 A1 | 11/2018 | Hill et al. |
| 2019/0322587 A1 | 10/2019 | Hill et al. |
| 2019/0382316 A1 | 12/2019 | Hill et al. |
| 2019/0393579 A1 | 12/2019 | Hill et al. |
| 2022/0029263 A1 | 1/2022 | Hill et al. |

FOREIGN PATENT DOCUMENTS

| | | |
|---|---|---|
| CN | 102249663 A | 11/2011 |
| CN | 102249664 A | 11/2011 |
| CN | 103121843 A | 3/2013 |
| CN | 103011810 A | 4/2013 |
| CN | 103172376 A | 6/2013 |
| CN | 104380526 | 2/2015 |
| CN | 105304991 A | 2/2016 |
| CN | 103715487 B | 3/2016 |
| CN | 106242547 A | 12/2016 |
| GB | 2235339 A | 2/1991 |
| IN | 8301DELNP2007 | 4/2006 |
| JP | H06-112028 A | 4/1994 |
| JP | H07-312509 A | 11/1995 |
| JP | H08-078284 A | 3/1996 |
| JP | H11-145577 A | 5/1999 |
| JP | 2001-028504 A | 1/2001 |
| JP | 2004-149382 | 5/2004 |
| JP | 2007-051050 | 3/2007 |
| JP | 2009-088089 A | 4/2009 |
| JP | 2011-515998 A | 5/2011 |
| KR | 10-2007-0021015 A | 2/2007 |
| KR | 10-0698440 | 3/2007 |
| WO | WO 2009/120667 A2 | 10/2009 |
| WO | WO 2010/047723 A1 | 4/2010 |
| WO | WO 2011/075123 A1 | 6/2011 |
| WO | WO 2012/082642 A2 | 6/2012 |
| WO | WO 2012/170259 A2 | 12/2012 |
| WO | WO 2013/173639 A2 | 11/2013 |
| WO | WO 2018/089853 | 5/2018 |
| WO | WO 2019/209614 | 10/2019 |

OTHER PUBLICATIONS

Chinese Office Action for Chinese Application No. 201811045092.X, dated Nov. 15, 2021.
Chinese Office Action for Chinese Application No. 201811045092.X, dated Apr. 28, 2022.
European Office Action for European Application No. 18192941.5, dated Dec. 3, 2018.
European Office Action for European Application No. 18192941.5, dated Mar. 19, 2020.
European Office Action for European Application No. 18192941.5, dated Apr. 30, 2021.
International Search Report and Written Opinion for International Application No. PCT/US2017/061184, dated Apr. 10, 2018.
International Preliminary Report on Patentability for International Application No. PCT/US2017/061184 dated May 14, 2019.
International Search Report and Written Opinion for International Application No. PCT/US2019/028055, dated Aug. 9, 2019.
International Preliminary Report on Patentability for International Application No. PCT/US2019/028055 dated Nov. 5, 2020.
International Search Report and Written Opinion for International Application No. PCT/US2019/038180, dated Oct. 4, 2019.
Japanese Office Action for Japanese Application No. 2018-167099, dated Nov. 16, 2021.
Decision to Grant for Japanese Application No. 2018-167099, dated Jun. 28, 2022.
Taiwanese Office Action for Taiwanese Application No. 106139371, dated Mar. 31, 2021.
Taiwanese Office Action for Taiwanese Application No. 106139371, dated Oct. 25, 2021.
Taiwanese Office Action for Taiwanese Application No. 106139371, dated Jun. 24, 2022.

(56) References Cited

OTHER PUBLICATIONS

Taiwanese Office Action for Taiwanese Application No. 107131408, dated Dec. 7, 2021.
United Kingdom Office Action for United Kingdom Application No. 2019933.7, dated Jul. 18, 2022.
Preparation of Ceramics in Low Temperature Sintered Microwave Medium, Studies in Structure and Performance, Thrones, Full Database of Previous Master Thesis in China, Engineering Technology I, Jan. 2015, B015-238, Jan. 15, 2015, in 2 pages.
Pang, L. et al., "Microwave Dielectric Properties of (Li0.5Ln0.5)MoO4 (Ln=Nd, Er, Gd, Y, Yb, Sm, and Ce) Ceramics", Journal of the American Ceramic Society, Sep. 2014, vol. 98(1), pp. 130-135.
Zhou, D. et al., "Phase evolution and microwave dielectric properties of $(Li_{0.5}Bi_{0.5})(W_{1-x}Mo_x)O4$ (0.0<x<1.0) ceramics with ultra-low sintering temperatures", Functional Materials Letters, Dec. 2012, vol. 5(4), pp. 1250042-1-1250042-5.
Zhou, H., et al., "Sintering characteristic, crystal structure and microwave dielectric properties of a novel thermally stable ultra-low-firing $Na_2BiMg_2V_3O_{12}$ ceramic", Journal of Materials Science: Materials in Electronics, Apr. 2014, vol. 25, pp. 2470-2474.
Taiwanese Office Action for Taiwanese Application No. 106139371, dated May 17, 2023.

INTEGRATED MICROSTRIP AND SUBSTRATE INTEGRATED WAVEGUIDE CIRCULATORS/ISOLATORS FORMED WITH CO-FIRED MAGNETIC-DIELECTRIC COMPOSITES

INCORPORATION BY REFERENCE TO ANY PRIORITY APPLICATIONS

This application is a continuation of U.S. application Ser. No. 16/915,829, filed Jun. 29, 2020, titled "METHODS FOR INTEGRATED MICROSTRIP AND SUBSTRATE INTEGRATED WAVEGUIDE CIRCULATORS/ISOLATORS FORMED WITH CO-FIRED MAGNETIC-DIELECTRIC COMPOSITES," which is a divisional of U.S. application Ser. No. 15/807,914, filed Nov. 9, 2017, titled "INTEGRATED MICROSTRIP AND SUBSTRATE INTEGRATED WAVEGUIDE CIRCULATORS/ISOLATORS FORMED WITH CO-FIRED MAGNETIC-DIELECTRIC COMPOSITES," which claims the benefit of U.S. Provisional Application No. 62/421,786, filed Nov. 14, 2016, titled "INTEGRATED MICROSTRIP CIRCULATORS FORMED WITH CO-FIRED MAGNETIC-DIELECTRIC COMPOSITES," and U.S. Provisional Application No. 62/506,958, filed May 16, 2017, titled "INTEGRATED MICROSTRIP CIRCULATORS FORMED WITH CO-FIRED MAGNETIC-DIELECTRIC COMPOSITES" and the entirety of each of which is incorporated herein by reference.

BACKGROUND

Field

Embodiments of the disclosure relate to co-fired microstrip circulators and/or substrate integrated waveguide circulators useful for 5G systems, for example operating at frequencies of 1.8 GHz and above.

Description of the Related Art

Circulators and isolators are passive electronic devices that are used in high-frequency (e.g., microwave) radio frequency systems to permit a signal to pass in one direction while providing high isolation to reflected energy in the reverse direction. Circulators and isolators commonly include a disc-shaped assembly comprising a disc-shaped ferrite or other ferromagnetic ceramic element, disposed concentrically within an annular dielectric element. Ferrite materials (spinel, hexagonal or garnet) have suitable low-loss microwave characteristics. The annular dielectric element is similarly commonly made of ceramic material.

SUMMARY

Disclosed herein are embodiments of an integrated microstrip circulator, the circulator comprising a dielectric substrate having an aperture, and a magnetic oxide disc fit within the aperture in the substrate, the dielectric substrate and magnetic oxide disc being co-fired together to contain the magnetic oxide disc within the aperture of the dielectric substrate.

In some embodiments, the circulator can further comprise a thin film circuit. In some embodiments, the magnetic oxide disc can be a yttrium iron garnet disc. In some embodiments, the circulator can be configured for use in above 3 MHz systems. In some embodiments, the disc can be magnetized prior to insertion within the aperture. In some embodiments, the circulator can further comprise a coupler, switch, and load located on the dielectric substrate. In some embodiments, the integrated microstrip circulator can be shaped like a square tile.

Also disclosed herein are embodiments of a method of forming a co-fired integrated microstrip circulator, the method comprising preparing a ferrite disc, preparing a dielectric substrate, the dielectric substrate having an aperture, translating the ferrite disc into the aperture in the dielectric substrate to form a composite structure, and co-firing the composite structure to shrink the dielectric substrate round the ferrite disc.

In some embodiments, the ferrite disc can be a magnetic oxide disc. In some embodiments, the dielectric substrate can be generally square or rectangular shaped. In some embodiments, the method can further comprise adding additional radiofrequency components onto the substrate. In some embodiments, the method can further comprise slicing the composite structure to a particular thickness, wherein each slice contains both a portion of the ferrite disc and a portion of the dielectric substrate. In some embodiments, the method can further comprise contacting a magnetic disc onto the composite structure to form a microstrip circulator. In some embodiments, the ferrite disc can be magnetized prior to translating. In some embodiments, the method can further comprise applying a coupler, switch, and load to the dielectric substrate.

Also disclosed herein are embodiments of a radiofrequency antenna system, the system comprising a dielectric substrate having an aperture, a magnetic oxide disc fit within the aperture in the substrate, the dielectric substrate and magnetic oxide disc being co-fired together to contain the magnetic oxide disc within the aperture of the dielectric substrate, a transmit power amplifier, a receive low noise amplifier, and a filter.

In some embodiments, the system can further comprise a semiconductor amplifier. In some embodiments, the system can further comprise a coupler, switch, and load located on the dielectric substrate. In some embodiments, the system can be configured to operate as a 5G system. In some embodiments, the disc can be magnetized prior to insertion within the aperture.

Disclosed herein are embodiments of an integrated microstrip or substrate integrated waveguide circulator comprising a dielectric substrate having an aperture, and a ferrite disc fit within the aperture in the substrate, the dielectric substrate and ferrite disc being co-fired together to contain the ferrite disc within the aperture of the dielectric substrate.

In some embodiments, the circulator can further comprise a thin film circuit. In some embodiments, the ferrite disc can be a yttrium iron garnet disc. In some embodiments, the circulator can be configured for use in above approximately 1.8 GHz systems. In some embodiments, the circulator can further include a coupler, switch, and load located on the dielectric substrate. In some embodiments, no adhesive may be used. In some embodiments, the dielectric substrate and ferrite disc can be co-fired at a temperature of at least 1000° C. In some embodiments, the ferrite disc and the dielectric substrate can be metallized together.

Also disclosed herein are embodiments of a method of forming a co-fired integrated microstrip or substrate integrated waveguide circulator, the method comprising preparing a ferrite disc, preparing a dielectric substrate, the dielectric substrate having an aperture, translating the ferrite disc into the aperture in the dielectric substrate to form a composite structure, co-firing the composite structure to shrink the dielectric substrate round the ferrite disc, and metallizing the composite structure.

In some embodiments, the ferrite disc can be a yttrium iron garnet disc. In some embodiments, the co-firing can be at a temperature of at least 1000° C. In some embodiments, the method can further include adding additional radio frequency components onto the substrate. In some embodiments, no adhesive may be used.

In some embodiments, the method can further include slicing the composite structure to a particular thickness, wherein each slice contains both a portion of the ferrite disc and a portion of the dielectric substrate. In some embodiments, the method can further include contacting a magnetic disc onto the composite structure to form a microstrip or substrate integrated waveguide circulator. In some embodiments, the method can further include applying a coupler, switch, and load to the dielectric substrate.

Also disclosed herein are embodiments of a radio frequency antenna system comprising a dielectric substrate having an aperture, a ferrite disc fit within the aperture in the dielectric substrate, the dielectric substrate and ferrite disc being co-fired together to contain the ferrite disc within the aperture of the dielectric substrate, a transmit power amplifier, a receive low noise amplifier, and a filter.

In some embodiments, the system can further include a semiconductor amplifier. In some embodiments, the system can further include a coupler, switch, and load located on the dielectric substrate. In some embodiments, the system can be configured to operate as a 5G system. In some embodiments, no adhesive may be used.

DETAILED DESCRIPTION

Disclosed herein are embodiments of integrated architectures for use in radiofrequency (RF) and/or electronic environments. The integrated architectures can include microstrip circulators, such as integrated ceramic substrate microstrip circulators, that can be formed using a co-firing process with a dielectric tile substrate. Specifically, a ferrite disc can be embedded into a dielectric substrate and co-fired to form an integrated microstrip circulator which may then serve as a platform for other components, such as circuitry. Thus, adhesives and other connecting features can be avoided, allowing for easier production and metallization of the microstrip circulators. Further, substrate integrated waveguide (SIWs) circulators can also be formed using the co-firing process disclosed herein. In some embodiments, a stripline (tri-plate) circulator can be formed as well using embodiments discussed herein.

Embodiments of the disclosure could advantageously allow for 5G systems, in particular operating at 1.8 GHz and above (and in some embodiment 3 GHz and above), to form integrated architectures which can include different components, such as antennas, circulators, amplifiers, and/or semiconductor based amplifiers. By allowing for the integration of these components onto a single substrate, this can improve the overall miniaturization of the device. In some embodiments, the disclosed devices can be operable at frequencies between about 1.8 GHz and about 30 GHz. In some embodiments, the disclosed device can be operable at frequencies of greater than about 1, 2, 3, 4, 5, 10, 15, 20, or 25 GHz. In some embodiments, the disclosed device can be operable at frequencies of less than 30, 25, 20, 15, 10, 5, 4, 3, or 2 GHz.

In some embodiments, the integrated architecture can include a directional coupler and/or isolator in a package size which is not much larger than a standard isolator, or equivalent size to a standard isolator. In some embodiments, the integrated architecture can include a high power switch. In addition to using the dielectric tile as the substrate for the impedance transformer, it could also be used as the substrate for the coupler, switch and termination.

Figure 1:
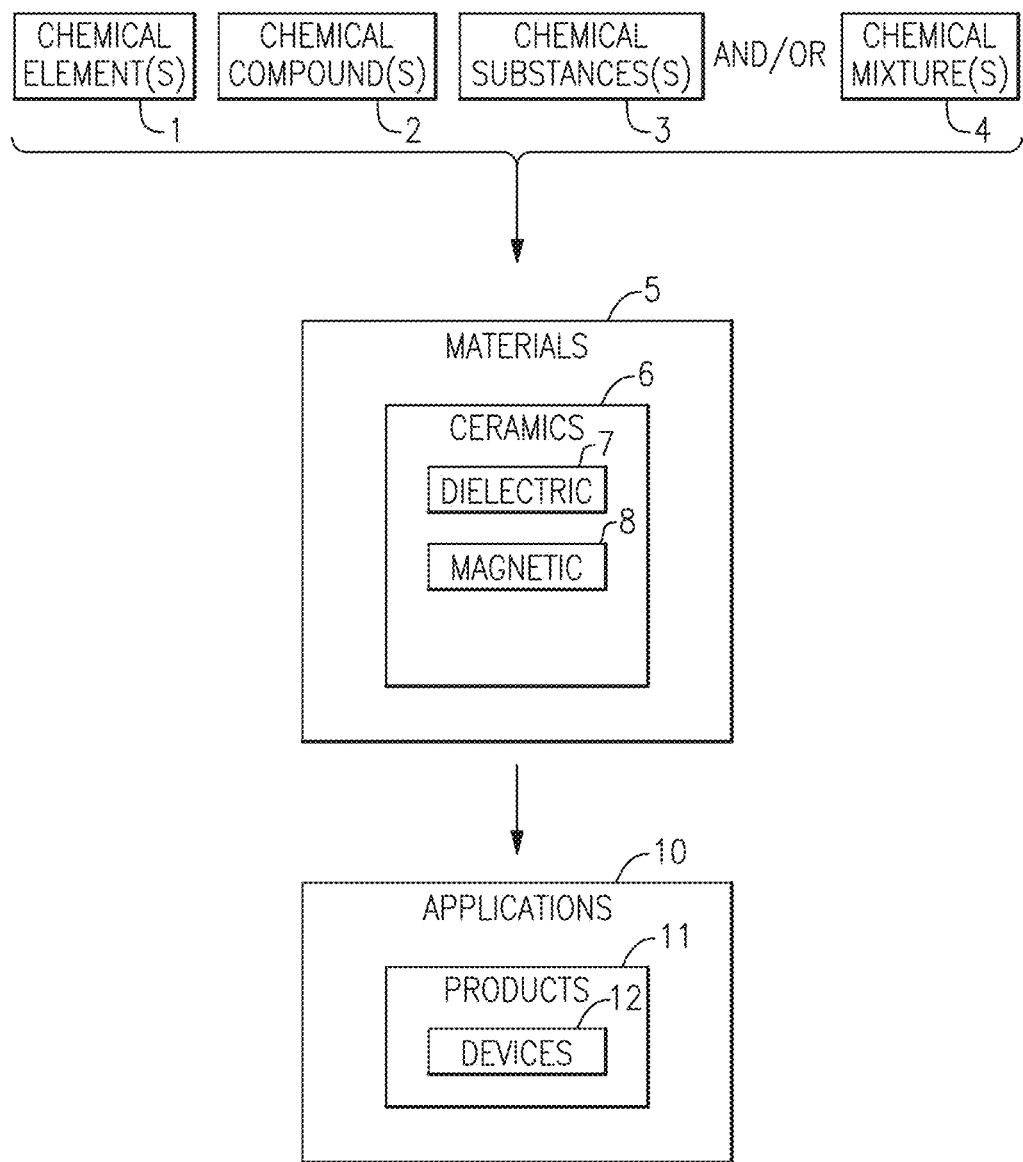
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Microstrip Circulators/Isolators

Circulators are passive multiport devices which can receive and transmit different signals, such as microwave or radiofrequency (RF). These ports can be an external waveguide or transmission line which connects to and from the circulator. Isolators are similar to circulators, but one or more of the ports can be terminated. Hence, circulator and isolator can be used interchangeably herein as they can be similar in general structural. Thus, all discussion below can apply both to circulators and isolators. Further, the circulators and isolators can be known as circulator packages and isolator packages, for example if they include extra components discussed herein.

Figure 2:
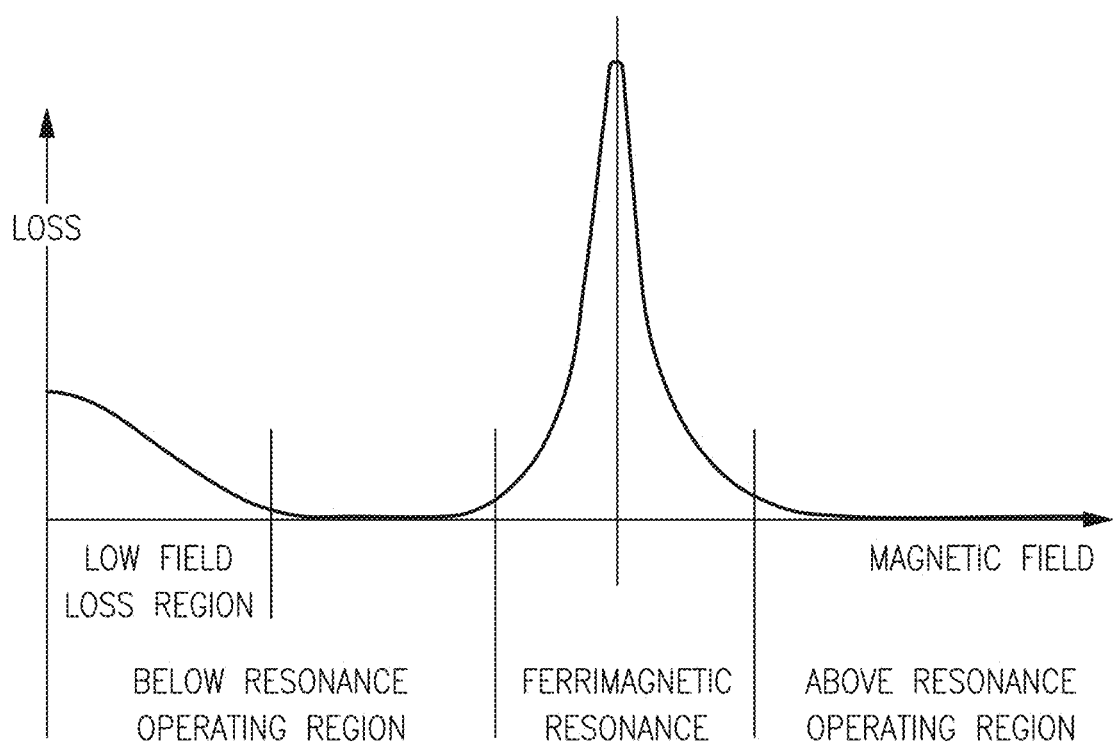
FIG. 2 illustrates a magnetic field v. loss chart.

Circulators generally can operate in either of the above or below resonance operating regions. This is shown in FIG. 2. In some embodiments, above-resonance frequencies can be advantageous for narrow band, sub 4GHz circulators. For higher frequencies, the below resonance region can be more advantageous.

Previously, some all-ferrite microstrip circulators have been used, in particular for radar T/R modules. Circuitry can be printed onto the all-ferrite microstrip circulator and a magnet can be added on top to direct the signal. For example, a metallization pattern is formed onto a ferrite substrate. Typically, the metallization pattern consists of a central disc and multiple transmission lines.

Microstrip circulators in particular typically work in the below resonance operating region. They use a very small magnet or can be self-biased, such as in the case of hexagonal ferrites. However, square tiles can be a difficult shape to magnetize uniformly, in particular for the all-ferrite microstrip circulators known in the art. Thus, they will operate close to the low field loss region. When transformers are mounted on the lossy unmagnetized ferrite, performance suffers. Further, increased power will make the poor performance even more known. Thus, circulators known in the art suffer from issues due to the ferrite tile being poorly magnetized, leading to poor insertion loss and intermodulation distortion (IMD), and degraded power performance.

Additionally, microstrip transmission lines suffer from increasing problems with higher frequencies, such as "overmoding". To avoid "overmoding", that is the creation of unwanted modes in the microstrip line, it can be advantageous to use thinner substrates and lower dielectric constants at higher frequencies, such as disclosed below. However, this, in turn, can lead to radiation from open microstrip with consequent losses and unwanted "box" modes in a transceiver enclosure.

Co-Fired Microstrip Circulators/Isolators and Substrate Integrated Waveguide (SIW) Circulators/Isolators Embodiments of the disclosure can improve overall magnetization and reduce performance issues that can occur for currently known circulators/isolators, in particular microstrip circulators/isolators and SIW circulators/isolators. Generally, the microstrip circulators/isolators and SIW circulators/isolators can be formed by embedding a ferrite disc, such as an oxide ferrite disc, or such as a disc made of yttrium iron garnet (YIG), directly into a dielectric substrate (for example in a hole/aperture), such as a high dielectric substrate. Unlike previously known methodologies, during the ceramic formation process, the combination of ferrite disc and dielectric substrate can then be fired together (e.g., co-fired) at high temperatures to form a more solid composite structure. For example, the ferrite disc and dielectric substrate can be co-fired together at generally the same or the same temperature. The co-fired assembly can then be metallized, thus providing the base for microstrip circulators/isolators and SIW circulators/isolators.

Advantageously, the co-firing of the dielectric substrate and ferrite disc can be performed without negatively impacting, or without significantly negatively impacting, the properties of either the ferrite disc or the dielectric substrate. Thus, in some embodiments the disc and substrate can be fired at the same time. Specifically, they can be fired at the same time while or after the ferrite disc is inserted into the dielectric substrate.

Specifically, the combination of the ferrite disc within the hole/aperture of the dielectric substrate can be co-fired so that the dielectric substrate shrinks around the ferrite disc. Both of these materials can be "fireable", meaning they have the ability to be fired or sintered in an oven/kiln/other heating device. In some embodiments, firing can change one or more properties of the material, such as the ceramic materials discussed herein. Embodiments of these assemblies can be used as microstrip circulators/isolators and SIW circulators/isolators for radiofrequency applications, such as for 5G applications.

Without the co-firing process, circuit metallization would not be able to be applied as the firing process can destroy the metallization, which is a significant problem for circulators/isolators known in the art that require separate firing of the dielectric substrate and ferrite disc. Methods previously used to avoid this issue are the use of all-ferrite circulators/isolators, though these have significant drawbacks as discuss above. Thus, embodiments of the disclosure alleviate many of the issues known in the art by allowing the dielectric substrate and ferrite disc to be co-fired together.

In some embodiments, the dielectric substrate and ferrite disc can be co-fired at temperatures of above 700, 800, 900, 1000, 1100, 1200, 1300, 1400, 1500, or 1600° C. In some embodiments, the dielectric substrate and ferrite disc can be co-fired at temperatures of below 700, 800, 900, 1000, 1100, 1200, 1300, 1400, 1500, or 1600° C.

Table 1 illustrates examples of ferrites and compatible dielectric that can be co-fired together. In some embodiments, the ferrite disc and the dielectric substrate are two different materials.

TABLE 1

Co-Fireable Materials Compatible With Ferrites

| Basic Ferrite Material System | Ferrite Firing Range/Maximum Dielectric Co-Fire Temperature | Compatible Co-Fired Dielectric With Dielectric Constant Range 4-10 | Compatible Co-Fired Dielectric With Dielectric Constant Range 10-40 | Compatible Co-Fired Dielectric With Dielectric Constant Range 40-100+ |
|---|---|---|---|---|
| YFe, YAlFe, GdYFe/CaVFe Garnets | 1300-1500° C. | N/A | Mg—Ca—Al—Zn Titanates | Bi Pyrochlores; Li, Na, Bi Vanadate/Molybdate/Tungstate based Scheelites |
| NiZn Spinels Mg Spinels | 1300° C. | BaWO4 + Additives; Na, Li Molybdate Spinels | Mg—Ca—Al—Zn Titanates | N/A |
| BiY Garnets Li Spinels Bi, Cu doped Spinels | 800-1000° C. | N/A | Li, Bi Molybdate/Tungstate; Na, Li, Ca, Mg, Zn Vanadate Garnets | Bi Pyrochlores; Li, Na, Bi Vanadate/Molybdate based Scheelites |

While Table 1 illustrates a number of compatible co-fireable dielectric and ferrite materials, it will be understood that the disclosure is not so limited to the above materials, and that other compatible co-firing materials can be used as well. For example, garnets, spinels, ferrites, oxides, molybdates, tungstates, titanates, vanadates, and pyrocholores can all be used.

Additional circuitry, connections, etc., such as formed from silver or other metalized substances, can be added to a co-fired assembly for the microstrip circulators/isolators and SIW circulators/isolators.

Previous circulators/isolators require the use glue (epoxy, or other adhesives) which would be destroyed by the metallization process temperature, such as taught in U.S. Pat. No. 7,687,014, hereby incorporated by reference in its entirety. Thus, previously there were significant difficulties in preparing metalized circulators/isolators as this process would loosen the combination of the ferrite disc and dielectric substrate. In fact, without the disclosed co-firing process, it is extremely difficult, if not impossible, to metallize the assembly once there is adhesive. This is because the temperature required for metallization is much higher than the use temperature for the adhesive, causing the adhesive to melt and/or lose adhesive. Further, the glue is lossy, increasing the insertion loss of glued components. The dielectric loss of the glue at high frequencies is greater than the magnetic or the dielectric material Moreover, previous iterations of assemblies fire the fireable substrate separate from the fireable disc due to the temperature for firing the substrate being too high, which can lead to melting, or at least considerably damaging the properties of the internal ferrite disc. Either both segments can be fired separately, or the ring can be fired first and then the assembly is fired together. For each of these approaches, the substrate will not sufficiently shrink around the disc and thus an adhesive will be needed to keep assembly together, leading to the issues discussed above.

Accordingly, embodiments of the disclosure do not use glue, epoxy, or other adhesives to combine the ferrite and the dielectric together, providing for advantageous metallization over the known art, and thus can be considered a "glueless assembly". Instead, in some embodiments the co-firing of the dielectric substrate and the ferrite disc can create mechanical friction between the disc and substrate, such as expanding of the disc and/or shrinking of the substrate, to hold the two components together.

Any number of different disc materials can be used, such as ferrite materials discussed above in Table 1. In some embodiments, the saturation magnetization levels of the ferrite disc material can range between 1000-5000 (or about 1000-about 5000) gauss. In some embodiments, the saturation magnetization levels of the ferrite disc material can range between 4000-5000 (or about 4000-about 5000) gauss. In some embodiments, the saturation magnetization levels of the ferrite disc material can be 1000, 2000, 3000, 4000, or 5000 gauss. In some embodiments, the saturation magnetization levels of the ferrite disc material can be greater than 1000, 2000, 3000, 4000, or 5000 gauss. In some embodiments, the saturation magnetization levels of the ferrite disc material can be less than 1000, 2000, 3000, 4000, or 5000 gauss. In some embodiments, the ferrite disc can be a magnetic oxide. In some embodiments, the ferrite disc can be a yttrium iron garnet.

Further, any number of different dielectric substrates known in the art can be used (See Table 1). In some embodiments, the dielectric can be formed from dielectric powder or low temperature co-fired ceramic (LTCC) tape. In some embodiments, the dielectric constant of the dielectric substrate can be below approximately 4 and above 6, 10, 15, 20, 25, 30, 40, 50, 60, 100, or 150. In some embodiments, the dielectric constant of the dielectric substrate can range from 6-30 (or about 6 to about 30). In some embodiments, the dielectric constant of the dielectric substrate can be below about 150, 100, 60, 50, 40, 30, 25, 20, 15, or 10. In some embodiments, the dielectric constant of the dielectric substrate can range from 10-40 (or about 10 to about 40). In some embodiments, the dielectric constant of the dielectric substrate can range from 4-10 (or about 4 to about 10). In some embodiments, the dielectric constant of the dielectric substrate can range from 40-100 (or about 40 to about 100).

Figure 3:
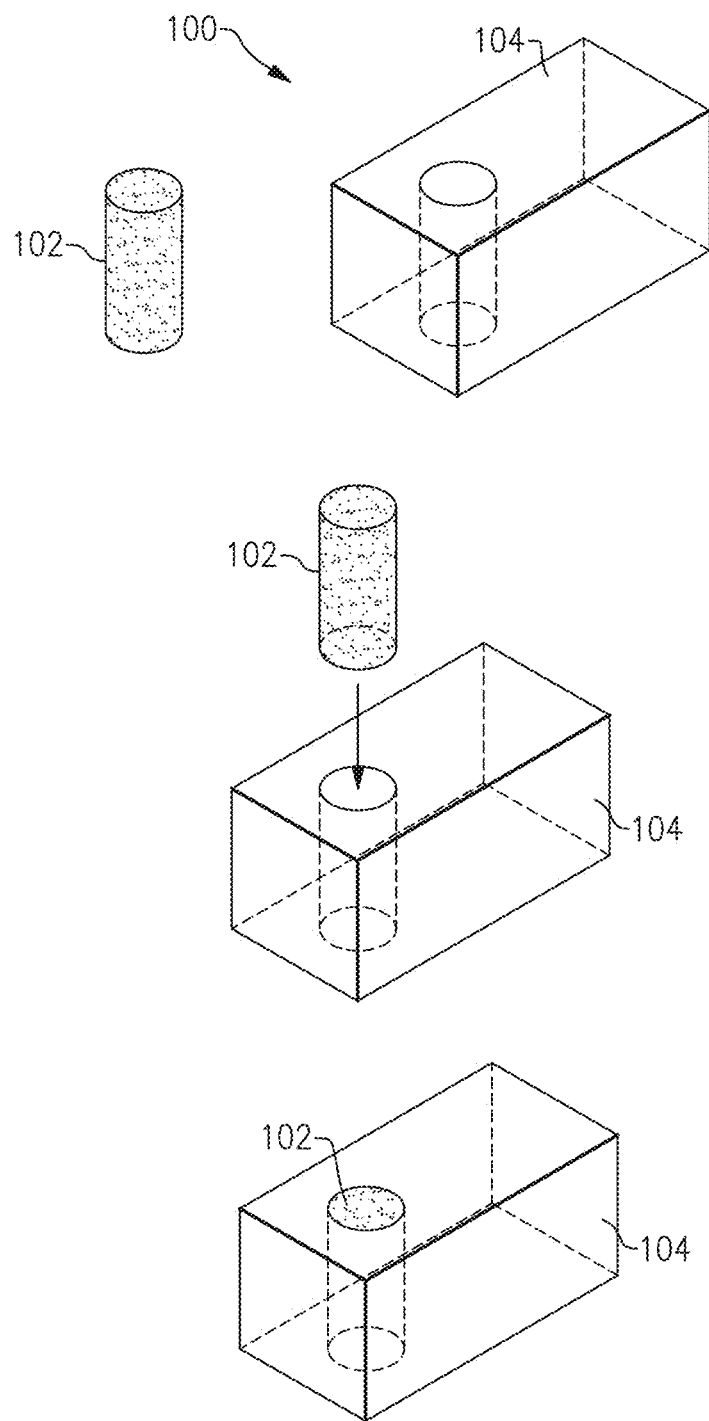
FIG. 3 illustrates an embodiment of a composite structure having a ferrite cylinder within a rectangular prism dielectric substrate.

Co-Fired Assemblies for Microstrip Circulators/Isolators and SIW Circulators/Isolators In particular, to form the co-fired circulator/isolator 100, a ferrite disc 102, or other magnetic disc, can be inserted into an aperture of a dielectric substrate 104 as shown in FIG. 3. This can be done for both microstrip and SIW circulators/isolators, though FIG. 3 shows a microstrip circulator/isolator. In some embodiments, the disc 102 can be a cylindrical rod, though the particular shape is not limiting. The disc 102 can be green, previously fired, or not-previously fired.

Figure 4:
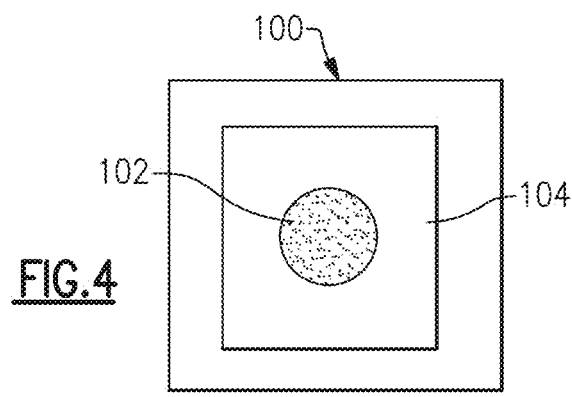
FIG. 4 illustrates an embodiment of a composite tile.
Figure 22:
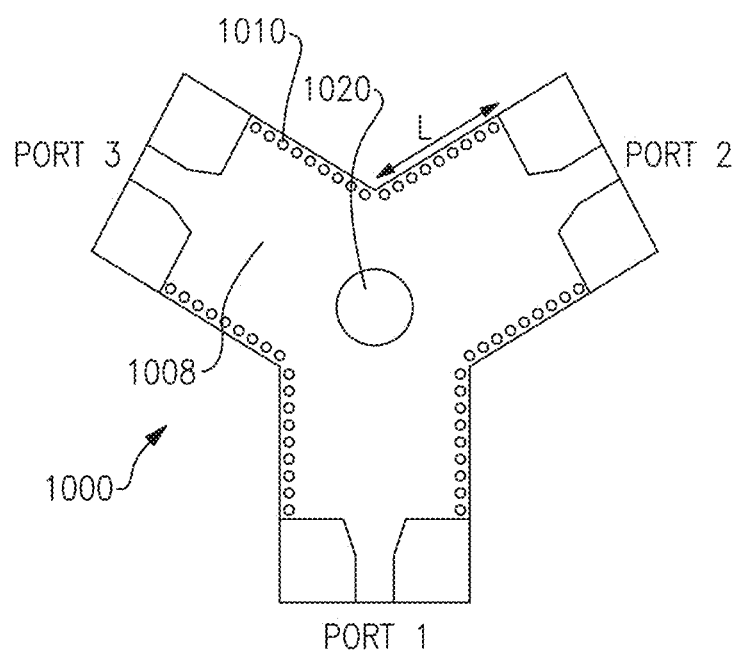
FIG. 22 illustrates an embodiment of a substrate integrated waveguide (SIW) circulator.

Further, the substrate 104 can generally be a rectangular shape as shown, but other shapes can be used as well. Once the disc 102 is inside the substrate 104, the components can be co-fired together, using such a method as discussed in U.S. Pat. No. 7,687,014, but without using an adhesive. This co-firing process, further discussed herein, can cause the substrate 104 to shrink around the disc 102 and hold it in place to form the composite structure 100. This composite structure 100 can then be sliced to form the chip structure as shown in FIG. 4 or FIG. 22. However, in some embodiments, slicing is not performed and the components are co-fired together at their final thickness. In some embodiments, a plurality of different discs can be inserted into a single substrate in a plurality of different apertures.

Thus, in some embodiments a ferrite disc can be co-fired into a square or rectangular dielectric substrate, or any other shaped substrate, which can then serve as a platform for other components, such as circuitry, magnets, switches, couplers, amplifiers, etc. This composite structure can then be magnetized to serve as a microstrip or SIW circulator and/or isolator package, for example, or the ferrite disc could have been magnetized prior to insertion. In some embodiments, the ferrite disc can be magnetized prior to the co-firing step.

Thus, using a co-firing process, a ferrite disc 102 can be embedded into a dielectric tile 104 to form an assembly 100, as shown in FIG. 4. The thin ferrite disc shown in the figure can be significantly easier to magnetize uniformly than a square, or other oddly shaped piece, known in the art. In some embodiments, the dielectric tile could be about 25 mm square though the particular dimensions are not limiting. This can be used in the 3-4 (or about 3-about 4) GHz region, but the frequency is not limiting.

Figure 5:
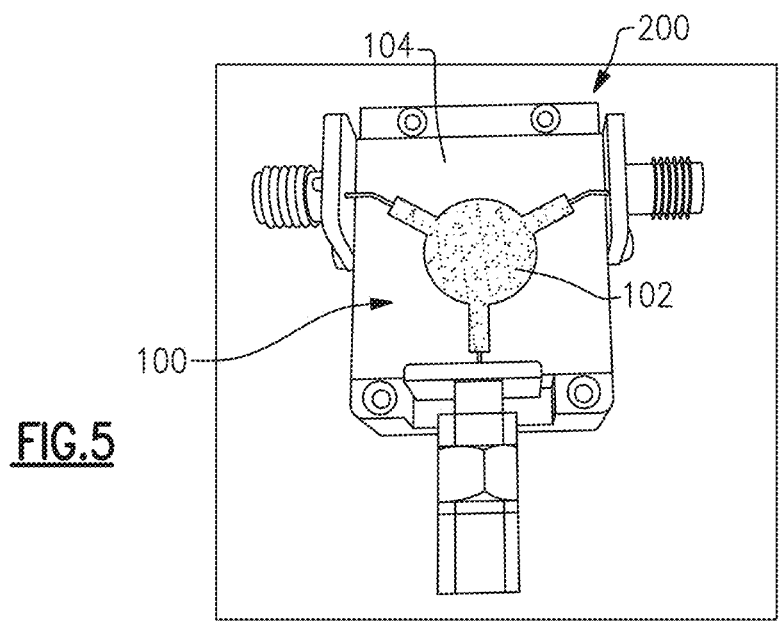
FIG. 5 illustrates an integrated microstrip circulator without a magnet.
Figure 6:
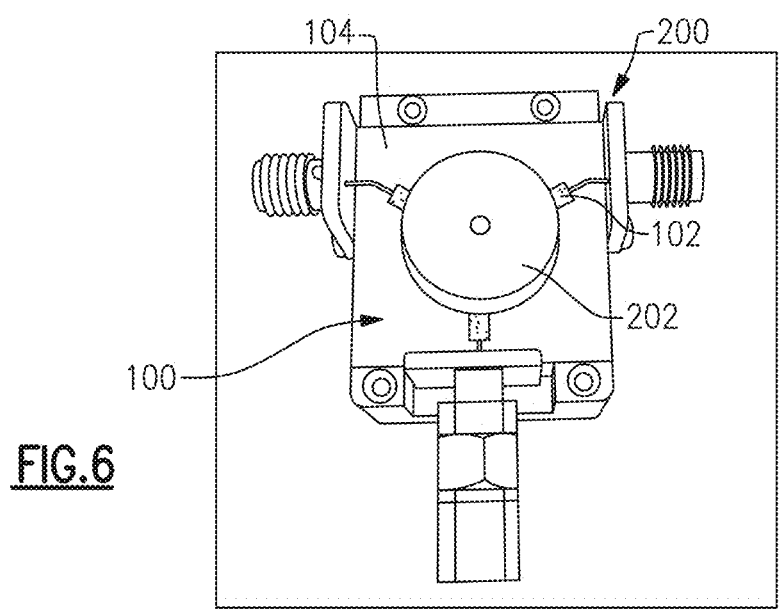
FIG. 6 illustrates an integrated microstrip circulator with a magnet.

Using the dielectric tile assembly 100, a transformer 200 can then be produced as shown in FIG. 5. As shown, the substrate 104 has space left over for other component attachments. After forming the transformer 200, only a small magnet needs to be placed on the tile, as shown in FIG. 6. Thus, assembly is much less complex than previously done. The transformer length depends on frequency and dielectric constant of the substrate.

In addition to using the dielectric tile 104 as the substrate for the impedance transformer, it could also be used as the substrate for the coupler, switch, and termination. Thus, a number of other components can be added onto the substrate after co-firing, reducing the overall footprint of the device. Further, circuit metallization could be added, but only after the device has been co-fired as discussed above. Microstrip isolators/circulators can be used as interstage isolators in the amplifier chain, as switched circulators as part of TDD designs or as circulators in FDD designs.

As mentioned above, in some embodiments the co-firing process can be used to form waveguide circulators/isolators, such as substrate integrated waveguide (SIW) circulators/isolators, essentially dielectric filled waveguides bounded by metallization that cannot readily radiate. These can be formed in bulk ceramic formed by complete thick film metallization. Thus, for example, a co-fired structure of magnetic and dielectric material can be used to form a SIW circulator at ~24 GHz.

Figure 21:
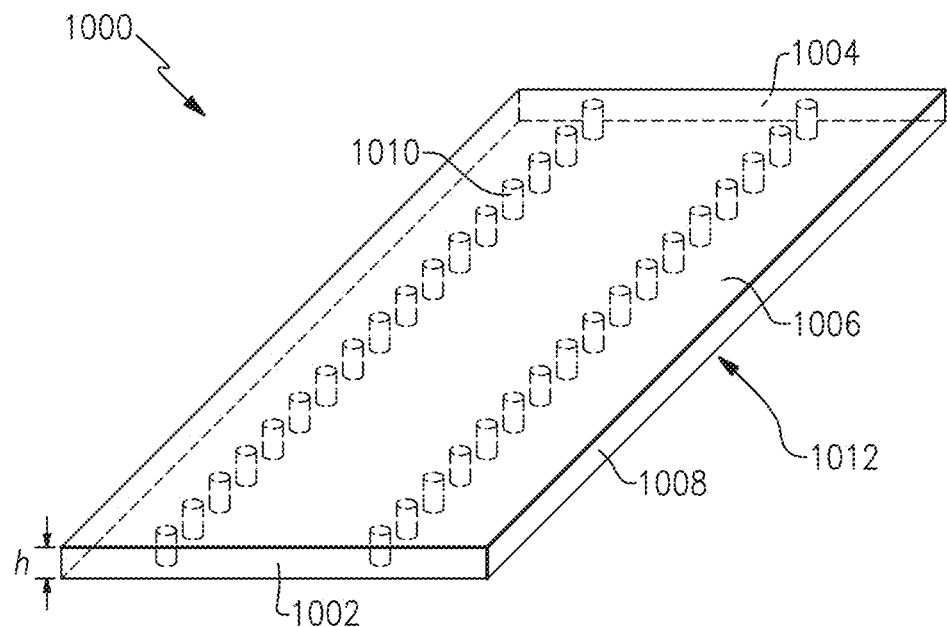
FIG. 21 illustrates an embodiment of a substrate integrated waveguide (SIW) incorporating embodiments of the disclosure.

FIG. 21 illustrates an embodiment of a substrate integrated waveguide 1000. As shown, the SIW 1000 can include a first port 1002 and a second port 1004. Between the two ports 1002/1004 can be a top ground plate 1006 and a bottom ground plate 1012 which sandwich a dielectric substrate 1008. The SIW 1000 can further include a plurality of metal vias 1010 extending through the thickness of the dielectric substrate 1008.

In some embodiments, the SIW 1000 can be used as a circulator or an isolator, similar to what is described above.

An example of a three port circulator/isolator is shown in FIG. 22, though other constructions of a SIW circulator/isolator can be used as well and the particular design is not limiting. As shown, the dielectric substrate 1008 can include a hole, aperture, etc., which can receive a ferrite disc/rod 1020. As discussed herein, the ferrite disc 1020 can be co-fired within the dielectric substrate 1008, and metallization can be performed after the co-firing. The circulator/isolator shown in FIG. 22 can be incorporated into a transformer such as shown in FIGS. 5-6.

Previews SIWs use PCB laminate material is used to form the broad walls of the waveguide, and closely spaced vias form the narrow walls, which can create a rectangular waveguide filled with printed circuit board (PCB) laminate material. An alternative to the use of PCB is a low temperature co-fired ceramic (LTCC), where a fireable ceramic tape replaces the PCB material. LTCC is limited in thickness and does not allow easy insertion of other dielectric or magnetic ceramics in tape or bulk form, because of firing temperature and/or expansion constraints. However, embodiments of the disclosed co-fired ceramics can replace the PCB and LTCC. Thus, embodiments of the disclosure can be used to create waveguides in bulk ceramic form by complete thick film metallization.

Once the composite structure is formed, other components can be added onto the substrate. For example, some components are printed on the dielectric part of the substrate, for example a coupler or microstrip filter. Antennas, amplifiers (e.g., semiconductor based amplifiers), can be integrated onto the assembly as well. Others may be mounted in packaged form onto the substrate, for example a packaged BAW or SAW filter or packaged amplifier.

Thus, embodiments of the disclosure can form an integrated solution which can include a directional coupler and/or isolator in a package size which is comparable to a standard isolator, depending on the type of component. In some embodiments, the disclosed circulator will be no larger (and depending on the ferrite/dielectric combination chosen could be smaller) than all current ferrite microstrip circulators. In some embodiments, the disclosed assembly can be 100%, 95%, 90%, 85%, or 80% of the dimensions as compared to a typical assembly which does not use co-firing process. In some embodiments, the disclosed assembly can be less than 100%, 95%, 90%, 85%, or 80% of the dimensions as compared to a typical assembly which does not use co-firing process. In some embodiments, the disclosed assembly can be greater than 95%, 90%, 85%, or 80% of the dimensions as compared to a typical assembly which does not use co-firing process.

5G Applications

Embodiments of the disclosed co-fired composite microstrip circulators/isolators and SIW circulators/isolators can be particularly advantageous for $5^{th}$ generation wireless system (5G) applications, though could also be used for early 4G and 3G applications as well. 5G technology is also referred to herein as 5G New Radio (NR). 5G networks can provide for significantly higher capacities than current 4G system, which allows for a larger number of consumers in an area. This can further improve uploading/downloading limits and requirements. In particular, the large number of microstrip circulators/isolators and SIW circulators/isolators, such as those described herein, needed for 5G (typically 1 per front end module or FEM) requires further integration of components. The disclosed embodiments of microstrip circulators/isolators and SIW circulators/isolators can allow for this integration and thus can be particularly advantageous. Other components in the front end module will be microstrip or SMT based.

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 7:
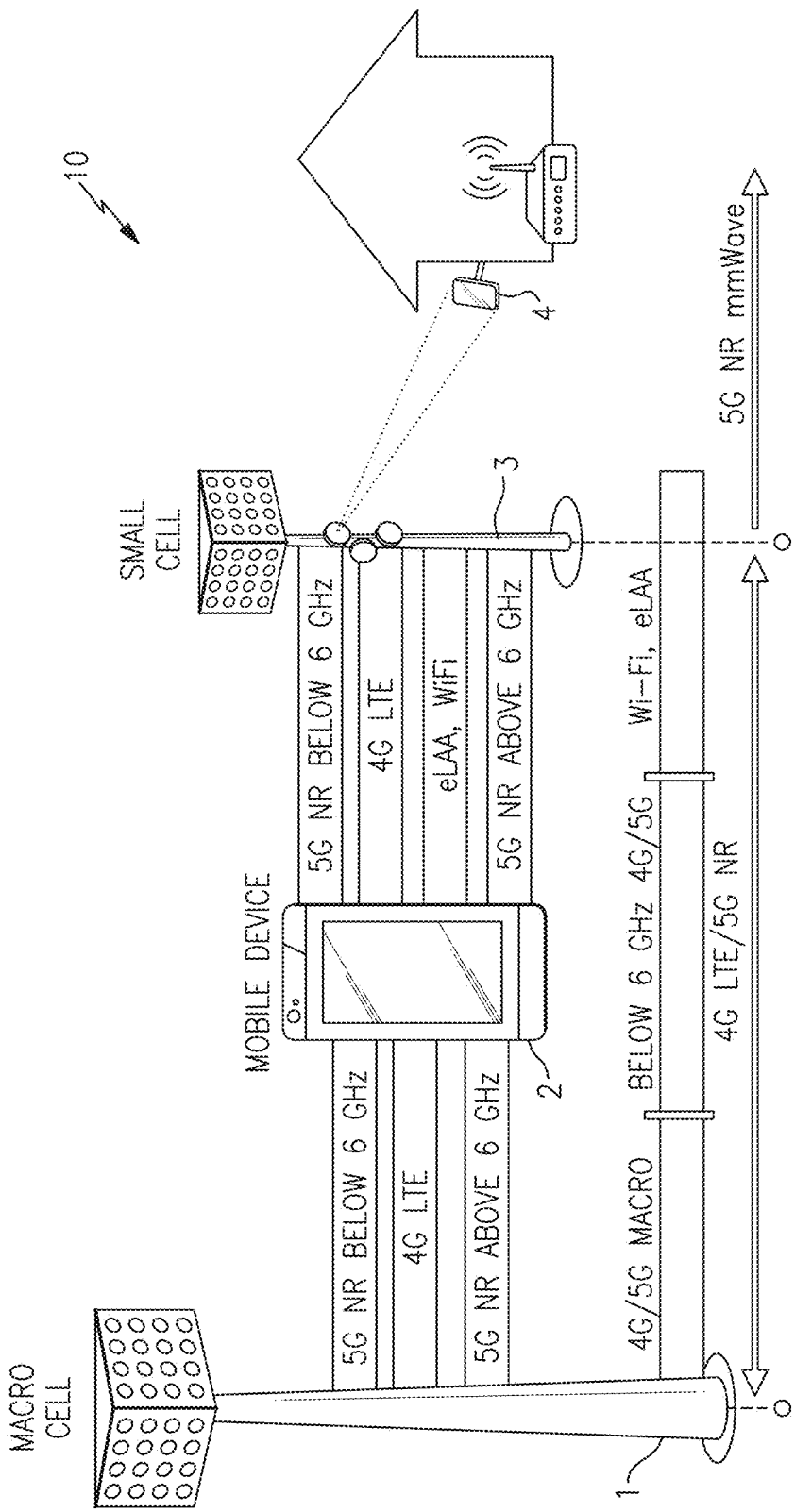
FIG. 7 is a schematic diagram of one example of a communication network.

FIG. 7 is a schematic diagram of one example of a communication network 10. The communication network 10 includes a macro cell base station 1, a mobile device 2, a small cell base station 3, and a stationary wireless device 4.

The illustrated communication network 10 of FIG. 7 supports communications using a variety of technologies, including, for example, 4G LTE, 5G NR, and wireless local area network (WLAN), such as Wi-Fi. Although various examples of supported communication technologies are shown, the communication network 10 can be adapted to support a wide variety of communication technologies.

Various communication links of the communication network 10 have been depicted in FIG. 7. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 7, the mobile device 2 communicates with the macro cell base station 1 over a communication link that uses a combination of 4G LTE and 5G NR technologies. The mobile device 2 also communicates with the small cell base station 3 which can include embodiments of the disclosure. In the illustrated example, the mobile device 2 and small cell base station 3 communicate over a communication link that uses 5G NR, 4G LTE, and Wi-Fi technologies.

In certain implementations, the mobile device 2 communicates with the macro cell base station 2 and the small cell base station 3 using 5G NR technology over one or more frequency bands that are less than 6 Gigahertz (GHz). In one embodiment, the mobile device 2 supports a HPUE power class specification.

The illustrated small cell base station 3, incorporating embodiments of the disclosure, also communicates with a stationary wireless device 4. The small cell base station 3 can be used, for example, to provide broadband service using 5G NR technology over one or more frequency bands above 6 GHz, including, for example, millimeter wave bands in the frequency range of 30 GHz to 300 GHz.

In certain implementations, the small cell base station 3 communicates with the stationary wireless device 4 using beamforming. For example, beamforming can be used to focus signal strength to overcome path losses, such as high loss associated with communicating over millimeter wave frequencies.

The communication network 10 of FIG. 7 includes the macro cell base station 1, which can include embodiments of the disclosure (such as the microstrip circulators/isolators and SIW circulators/isolators), and the small cell base station 3. In certain implementations, the small cell base station 3 can operate with relatively lower power, shorter range, and/or with fewer concurrent users relative to the macro cell base station 1. The small cell base station 3 can also be referred to as a femtocell, a picocell, or a microcell.

Although the communication network 10 is illustrated as including two base stations, the communication network 10 can be implemented to include more or fewer base stations and/or base stations of other types.

The communication network 10 of FIG. 7 is illustrated as including one mobile device and one stationary wireless device. The mobile device 2 and the stationary wireless device 4 illustrate two examples of user devices or user equipment (UE). Although the communication network 10 is illustrated as including two user devices, the communication network 10 can be used to communicate with more or fewer user devices and/or user devices of other types. For example, user devices can include mobile phones, tablets, laptops, IoT devices, wearable electronics, and/or a wide variety of other communications devices.

User devices of the communication network 10 can share available network resources (for instance, available frequency spectrum) in a wide variety of ways.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 ms. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 7 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B*\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 8:
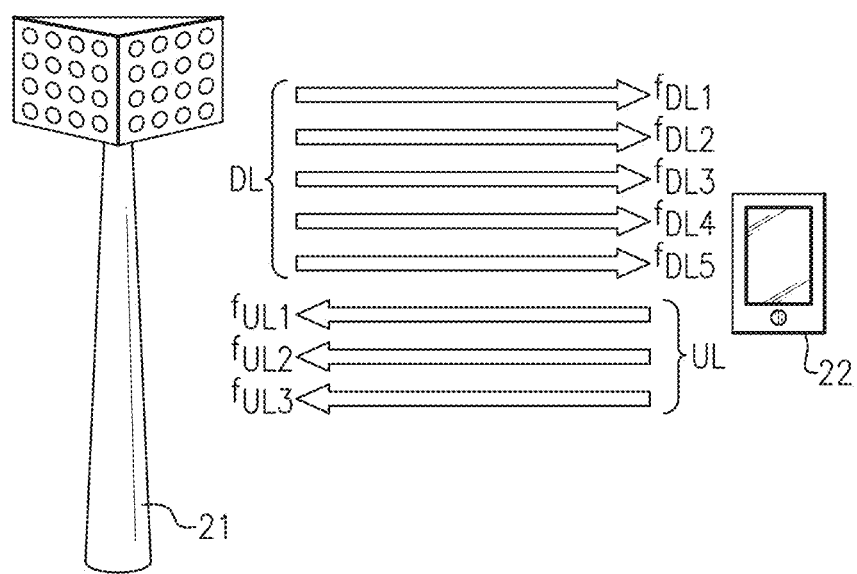
FIG. 8 is a schematic diagram of one example of a communication link using carrier aggregation.

FIG. 8 is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 8 the communications link includes a downlink channel used for RF communications from the base station 21 to the mobile device 22, and an uplink channel used for RF communications from the mobile device 22 to the base station 21.

Although FIG. 8 illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 8, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

With reference to FIG. 8, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Figure 9A:
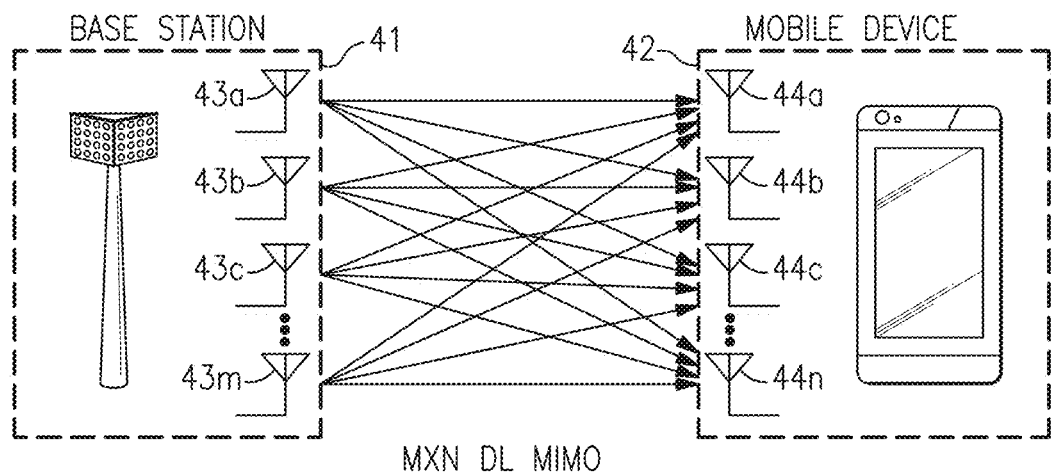
FIG. 9A is a schematic diagram of one example of a downlink channel using multi-input and multi-output (MIMO) communications.
Figure 9B:
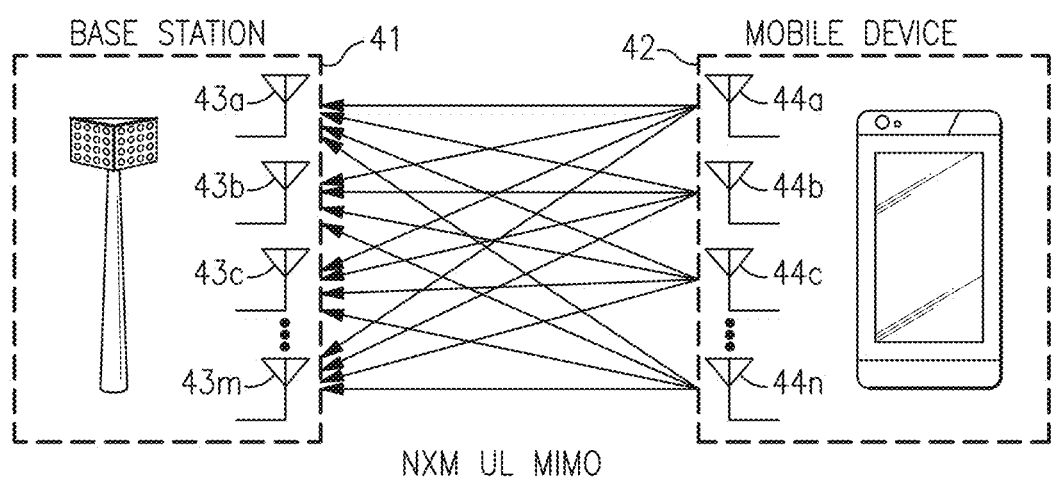
FIG. 9B is schematic diagram of one example of an uplink channel using MIMO communications.

FIG. 9A is a schematic diagram of one example of a downlink channel using multi-input and multi-output (MIMO) communications. FIG. 9B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 9A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 9A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 9B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 9B illustrates an example of N×M UL MIMO.

By increasing the level or order of MIMO, bandwidth of an uplink channel and/or a downlink channel can be increased.

Although illustrated in the context of FDD, MIMO communications are also applicable communication links using TDD.

For these 5G networks, one form of base station will be massive multiple input, multiple output (MIMO) based, with an array of perhaps 64-128 antennas capable of multi-beam forming to interact with handheld terminals at very high data rates. Thus, embodiments of the disclosure can be incorporated into the base stations to provide for high capacity applications.

This approach is similar to radar phased array T/R modules, with individual transceivers for each antenna element, although massive MIMO is not a phased array in the radar sense. The objective is optimum coherent signal strength at the terminal(s) rather than direction finding. Further, signal separation will be time division (TD) based, requiring a means of duplexing/switching to separate Tx and Rx signals For discussion, it is assumed that there is one Tx, one Rx module, one duplexing circulator and one antenna filter per antenna. However, other configurations can be used as well.

FIG. 7 shows a simplified version of an RF transmission system, omitting drivers and switching logic. As shown, the system can include a number of different components, including microstrip circulators/isolators and SIW circulators/isolators. Thus, embodiments of the disclosure can be used as the microstrip circulators/isolators and SIW circulators/isolators in the RF system, either for newly created systems or as improved replacements for the previous systems.

Figure 10:
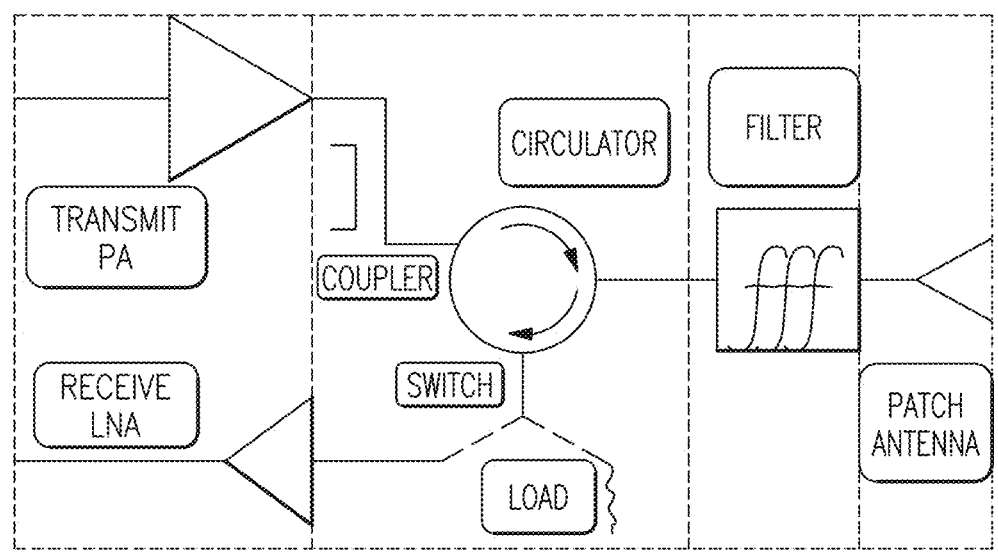
FIG. 10 illustrates a schematic of an antenna system.

FIG. 10 illustrates the integrated component of FIG. 4 discussed above onto the simplified RF antenna structure. As shown, the substrate can include the co-fired microstrip circulators/isolators and SIW circulators/isolators disclosed herein. In addition, a coupler, switch, and load can also be applied to the dielectric tile outside of the ferrite. The conductors and the ground plane could be in a thick film silver. In some embodiments, the circulator subassembly can also be integrated with the power amplifier (PA) and loud noise amplifier (LNA) modules.

Embodiments of the disclosed microstrip circulators/isolators and SIW circulators/isolators can have advantages over circulators and/or SIWs known in the art. For example:

Couplers and other transmission lines have much lower insertion loss compared with other couplers, such as semiconductor couplers Coupling is more consistent Loads can dissipate heat more easily compared with soft substrate Circulators have lower loss than all-ferrite substrate based devices The dielectric is temperature stable, assisting the coupler and circulator's performance The size of the devices can be reduced by using higher dielectric constant ceramic dielectric if required Further, embodiments of the microstrip circulators/isolators and SIW circulators/isolators can have the following advantages:

Heat/power dissipation/thermal conductivity for PA and load

Isotropic dielectric (except TTB) for coupler/filter design

Range of dielectric constant (4-100+) for size reduction

Low dielectric loss (coupler/filter)

Tight dielectric constant tolerance (coupler/filter/antenna)

Stable dielectric constant over temperature (coupler/filter/circulator)

Modest Cost

On the other hand, soft substrate (e.g., softboards) can have the following disadvantages:

Poor conductivity due to plastic conductivity

Anisotropic (xy versus z direction)

Only 3-10 with some, fixed with others

Higher losses

Looser tolerances

Unstable over temperature

Accordingly, embodiments of the disclosed microstrip circulators/isolators and SIW circulators/isolators can have significant advantages over circulators and SIWs previously known in the art.

Figure 11:
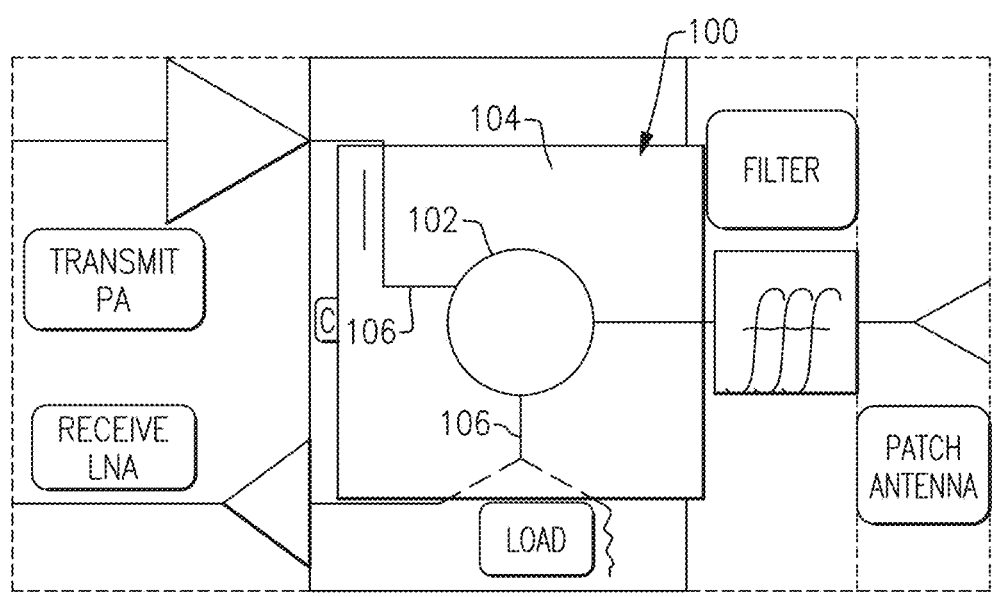
FIG. 11 illustrates a schematic of an antenna system with an embodiment of an integrated microstrip circulator.
Figure 12:
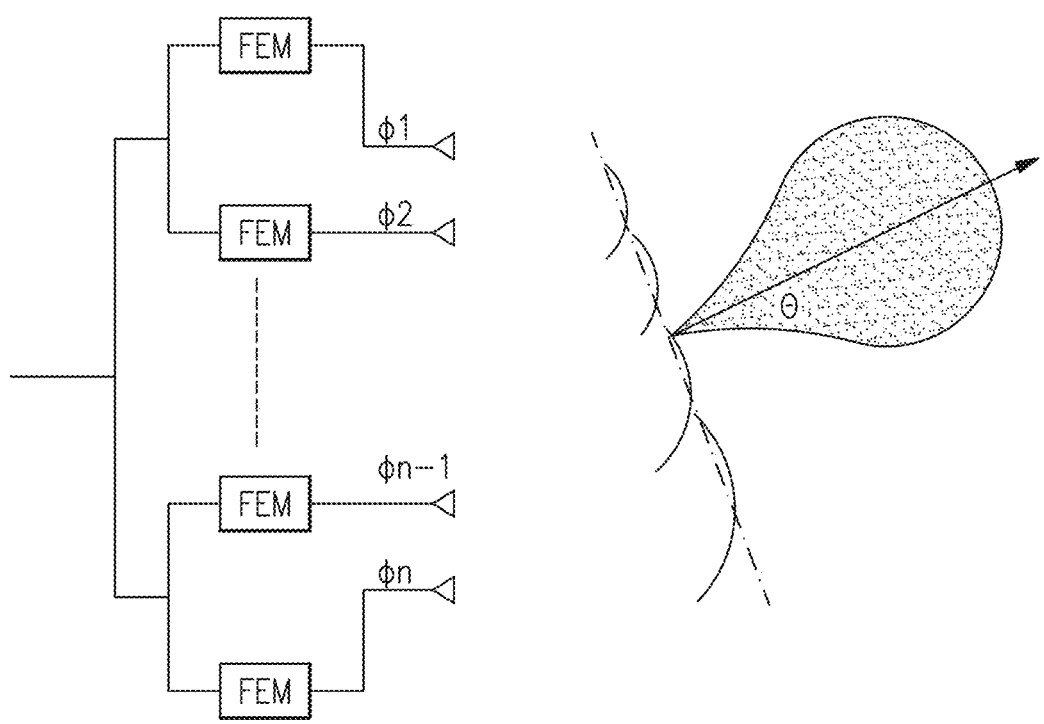
FIG. 12 illustrates a MIMO system incorporating embodiments of the disclosure.

FIG. 12 illustrates another embodiment of a MIMO system that the disclosed microstrip circulators/isolators and SIW circulators/isolators can be incorporated into. With the advent of massive MIMO for 5G system the current antennas will be replaced with antenna arrays with, for example, 64 array elements. Each element can be fed by a separate front end module (FEM) including the blocks shown in FIGS. 10 and 11 in which embodiments of the microstrip circulator formed on the co-fired tile can be an integral component.

Figure 13:
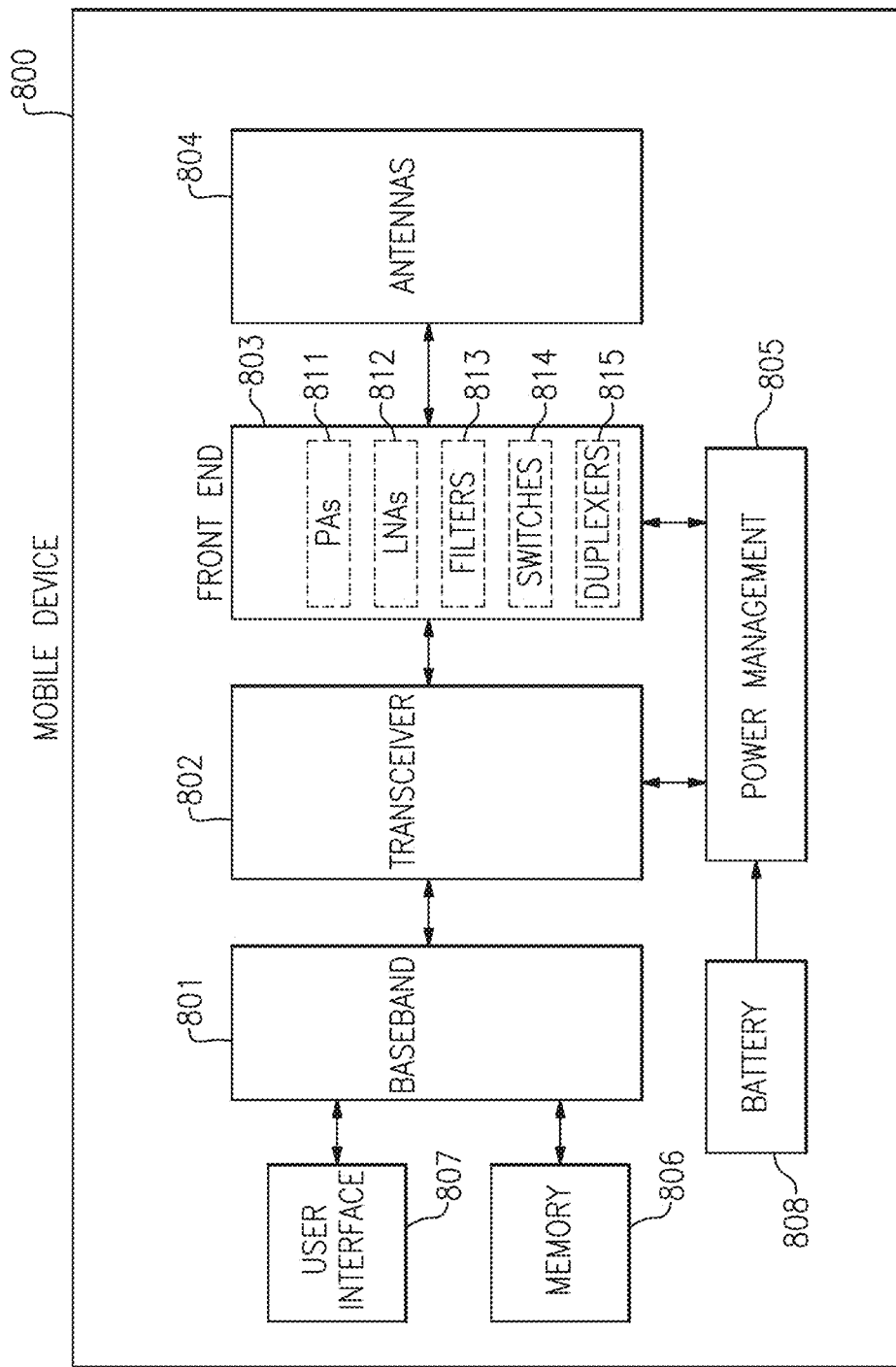
FIG. 13 is a schematic diagram of one example of a mobile device.

FIG. 13 is a schematic diagram of one example of a mobile device 800. The mobile device 800 includes a baseband system 801, a transceiver 802, a front end system 803, antennas 804, a power management system 805, a memory 806, a user interface 807, and a battery 808 and can interact with the base stations including embodiments of the microstrip circulators disclosed herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 13 as the transceiver 802. In one example, separate components (for instance, separate circuits or dies) can be provided for handling certain types of RF signals.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas associated transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

Figure 14:
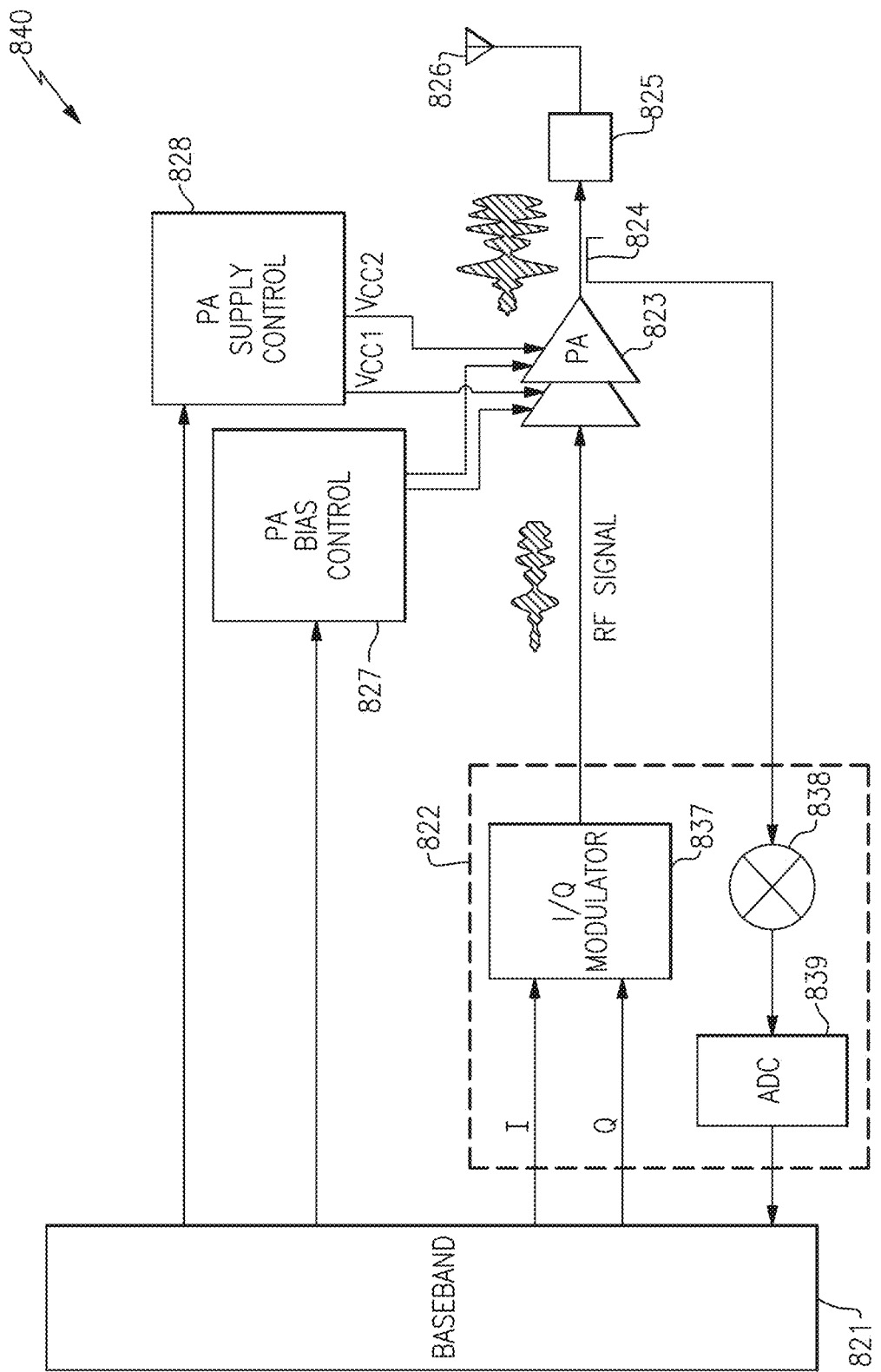
FIG. 14 is a schematic diagram of a power amplifier system according to one embodiment.

FIG. 14 is a schematic diagram of a power amplifier system 840 according to one embodiment. The illustrated power amplifier system 840 includes a baseband processor 821, a transmitter 822, a power amplifier (PA) 823, a directional coupler 824, a bandpass filter 825, an antenna 826, a PA bias control circuit 827, and a PA supply control circuit 828. The illustrated transmitter 822 includes an I/Q modulator 837, a mixer 838, and an analog-to-digital converter (ADC) 839. In certain implementations, the transmitter 822 is included in a transceiver such that both transmit and receive functionality is provided. Embodiments of the disclosed microstrip circulators/isolators and SIW circulators/isolators can be incorporated into the power amplifier system.

Methodology

Figure 15:
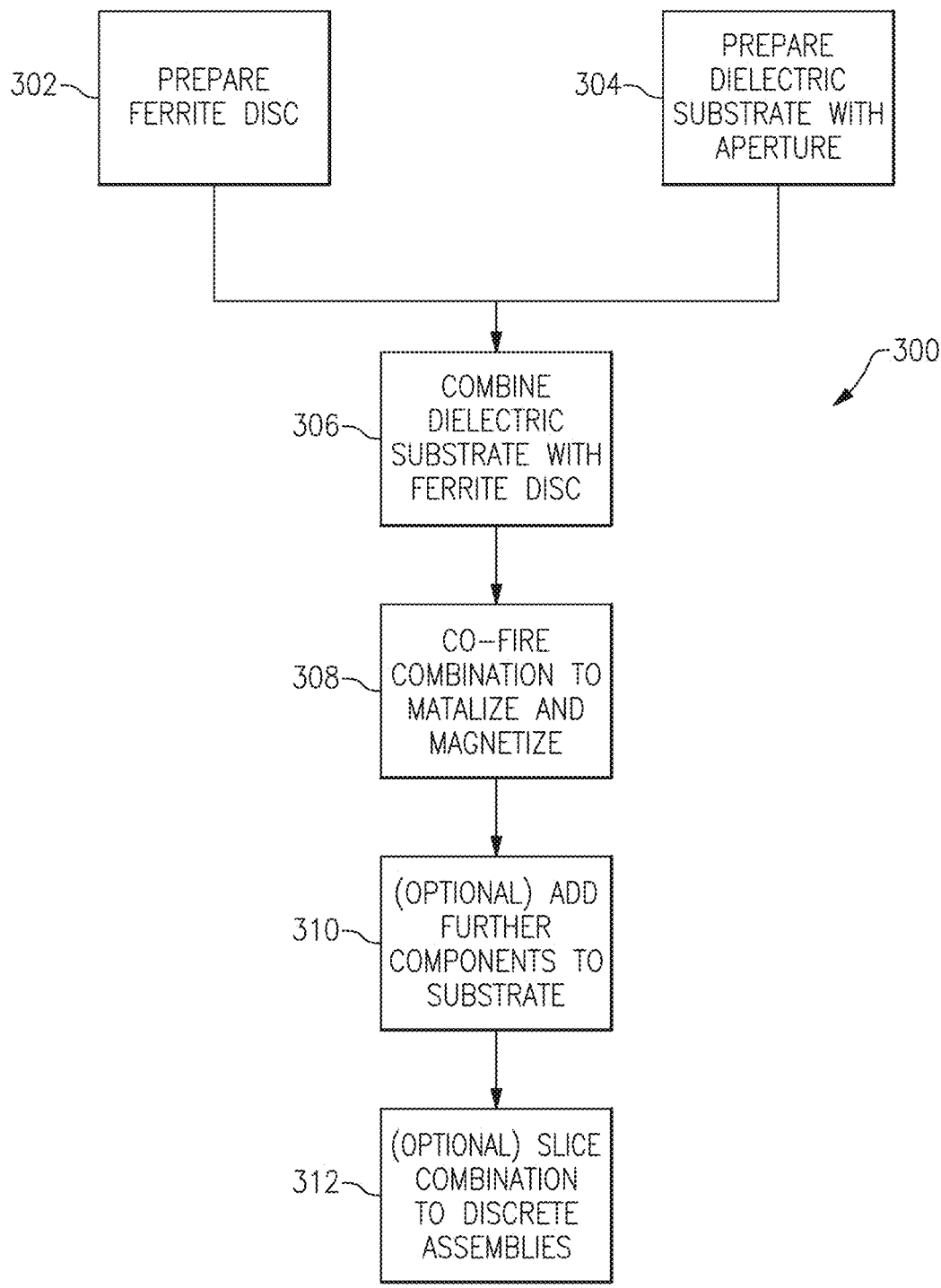
FIG. 15 illustrates a method of forming a composite integrated microstrip circulator.

Disclosed herein are embodiments of a process for making microstrip circulators/isolators and SIW circulators/isolators. FIG. 15 discloses an embodiment of a process 300 that can be used.

Returning to FIG. 15, at step 302, a ferrite disc or cylinder can be formed from a magnetic ceramic material by any suitable conventional process known in the art for making such elements, i.e., ferrites of the types used in high frequency electronic components. Similarly, at step 304, a substrate can be formed from a dielectric material by any suitable conventional process. In some embodiments, the ferrite disc can be sintered by firing it in a kiln. Some examples of materials and firing temperatures are set forth below, following this process flow description. However, persons skilled in the art to which the invention relates understand that the materials and processes by which magnetic ceramic and dielectric ceramic elements of this type are made are well known in the art. Therefore, suitable materials and temperatures are not listed exhaustively. All such suitable materials and process for making such rods, cylinders and similar elements of this type are intended to be within the scope of the invention.

At step 306, the disc can be combined into the dielectric substrate with the aperture. For example, the outside surface of the disc can be machined to ensure it is of an outside diameter (OD) that is less than the inside diameter (ID) of the substrate aperture. In some embodiments, the OD is slightly smaller than the ID to enable the disc to be inserted into the substrate.

In some embodiments, the pre-fired disc can be received in an unfired or "green" substrate to form the composite assembly 100 shown in FIG. 4.

At step 308, the disc and substrate can be co-fired. That is, composite assembly 100 is fired. The co-firing temperature can be lower than the temperature at which disc was fired, to ensure that the physical and electrical properties of the disc remain unchanged. Importantly, co-firing causes the substrate to shrink around the disc, thereby securing them together. Afterwards, the outside surface of the composite assembly 100 can then be machined to ensure it is of a specified or otherwise predetermined OD. Further, this step can be used to metalize and/or magnetize the composite assembly 100 if the ferrite disc has not previously been magnetized.

Steps 310 and 312 show optional steps that can be taken after the co-firing of the composite assembly 100. For example, additional components can be added 310 onto the substrate, such as circuitry (e.g., metalize d circuitry), to form final electronic components. Further, in some embodiments the composite assembly 100 can be sliced 312, or otherwise partitioned, to form a number of discrete assemblies. In some embodiments, both these optional steps can be performed and the particular order is not limiting. In some embodiments, only one of the optional steps can be taken. In some embodiments, neither of the optional steps can be taken.

Accordingly, composite assemblies 100 can be used in manufacturing high frequency electronic components in the same manner as conventionally-produced assemblies of this type. However, the method of the present invention is more economical than conventional methods, as the invention does not involve the use of adhesives.

EXAMPLES

Figure 16:
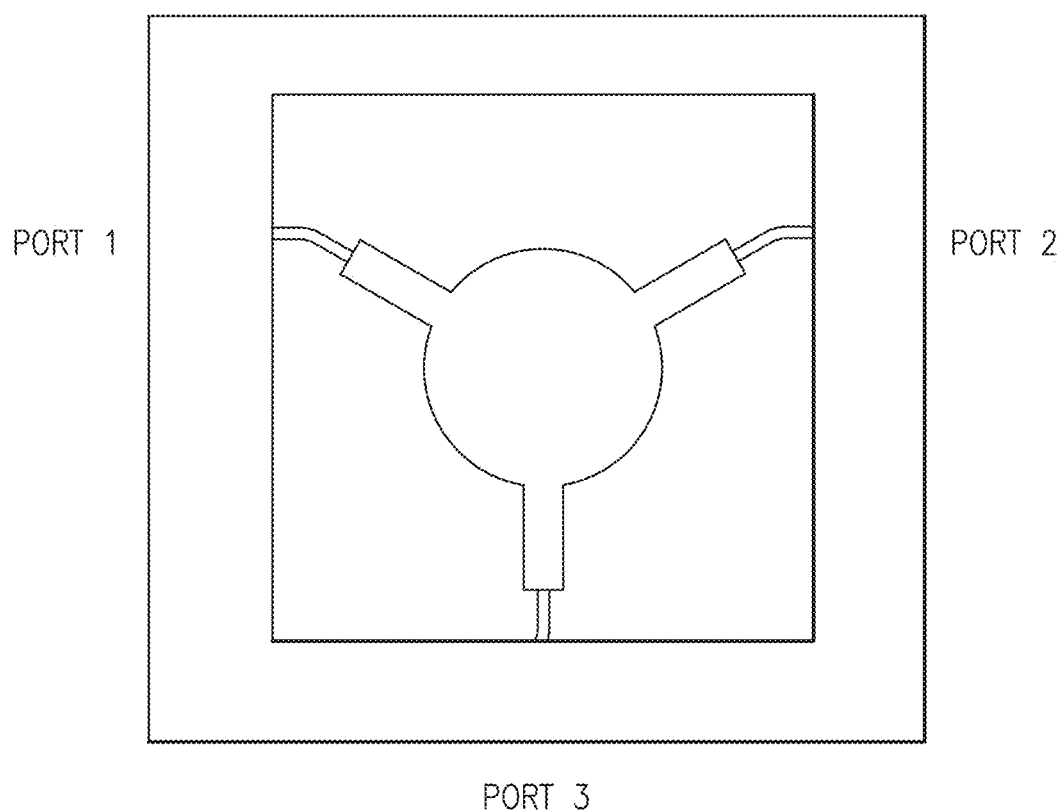
FIG. 16 illustrates an embodiment of an integrated microstrip circulator for testing.

FIG. 16 illustrates an example embodiment of a circulator as discussed herein. Thick film silver can be printed as the circuit. As per standard circulator applications, the circulator includes Port 1, Port 2, and Port 3. One of these ports can be terminated to form an isolator.

FIGS. 17A-20B illustrate the scattering parameter measurements (S-parameter measurements), in particular the return loss on a standard graph and a Smith Chart.

Figure 17A:
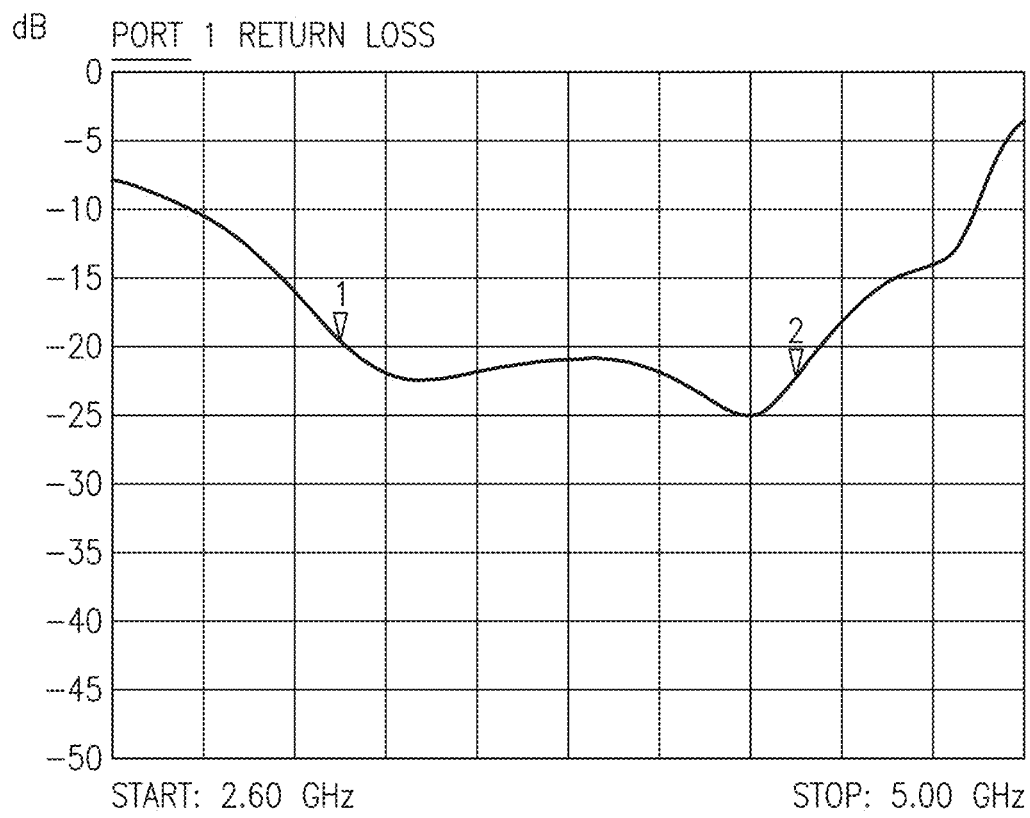
FIGS. 17A-20B illustrate testing results of an embodiment of the disclosed integrated microstrip circulator of FIG. 16.
Figure 17B:
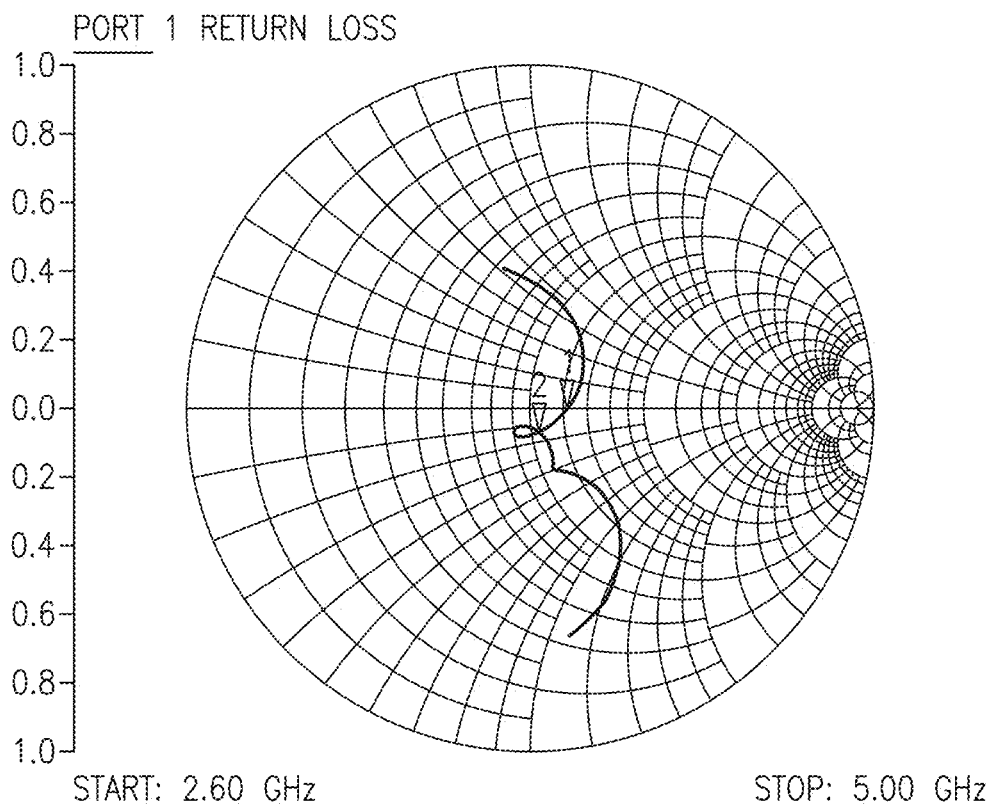
Figure 18A:
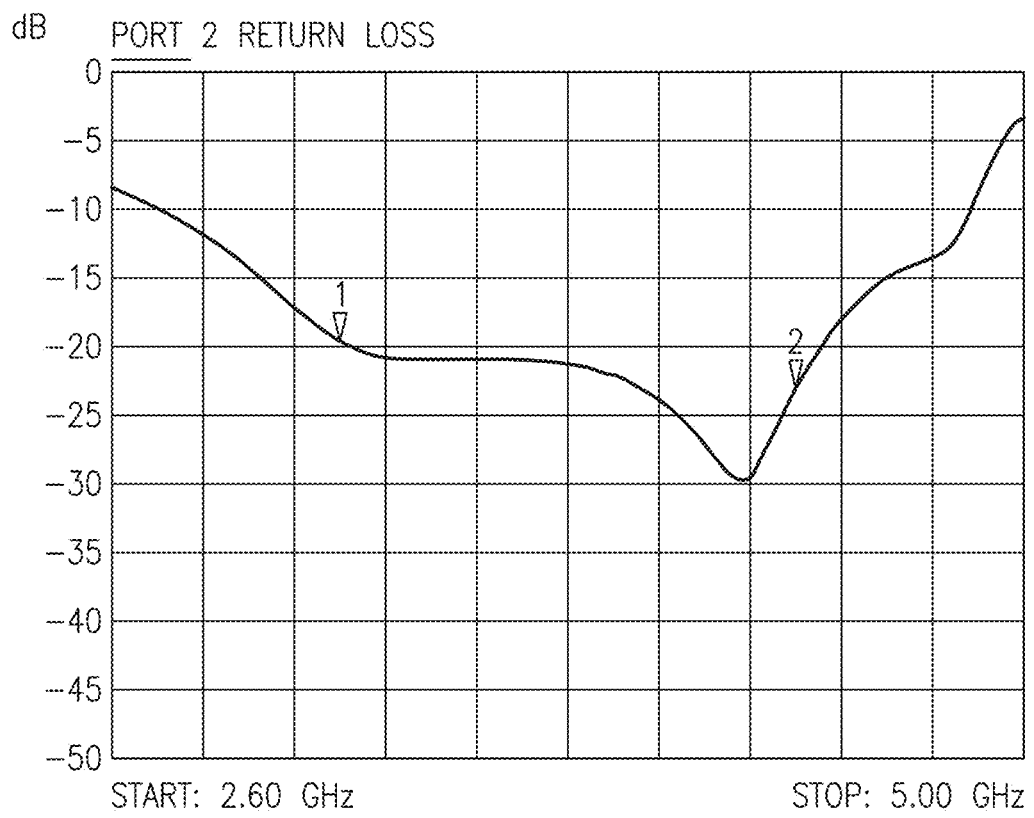
Figure 18B:
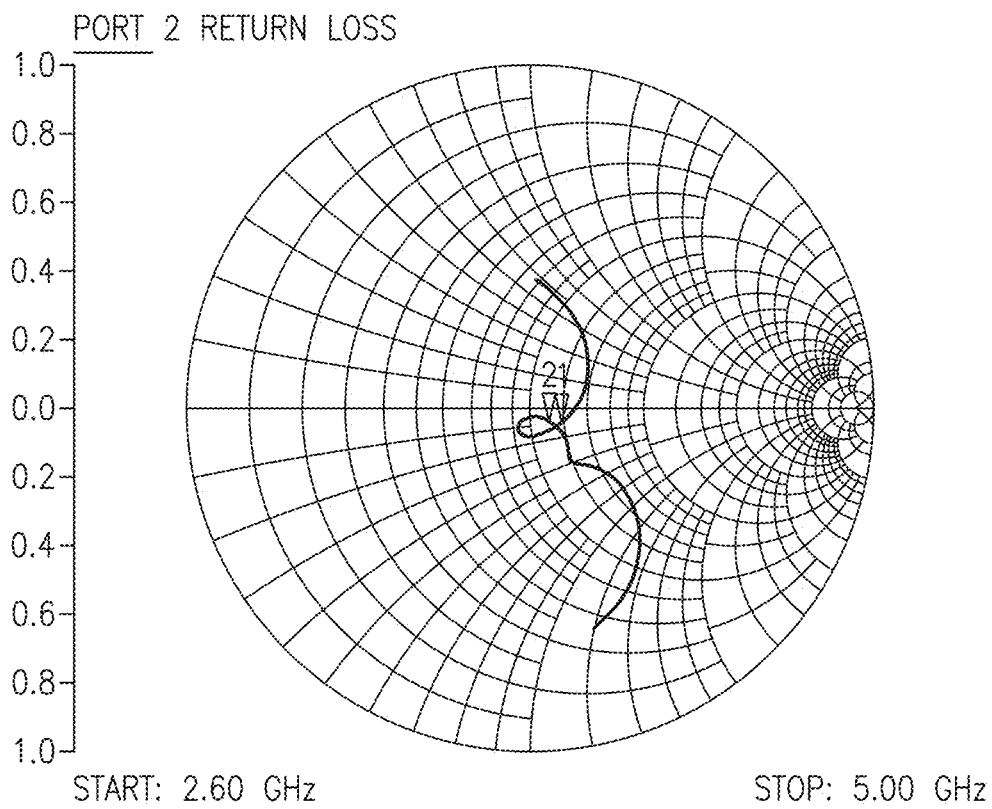
Figure 19A:
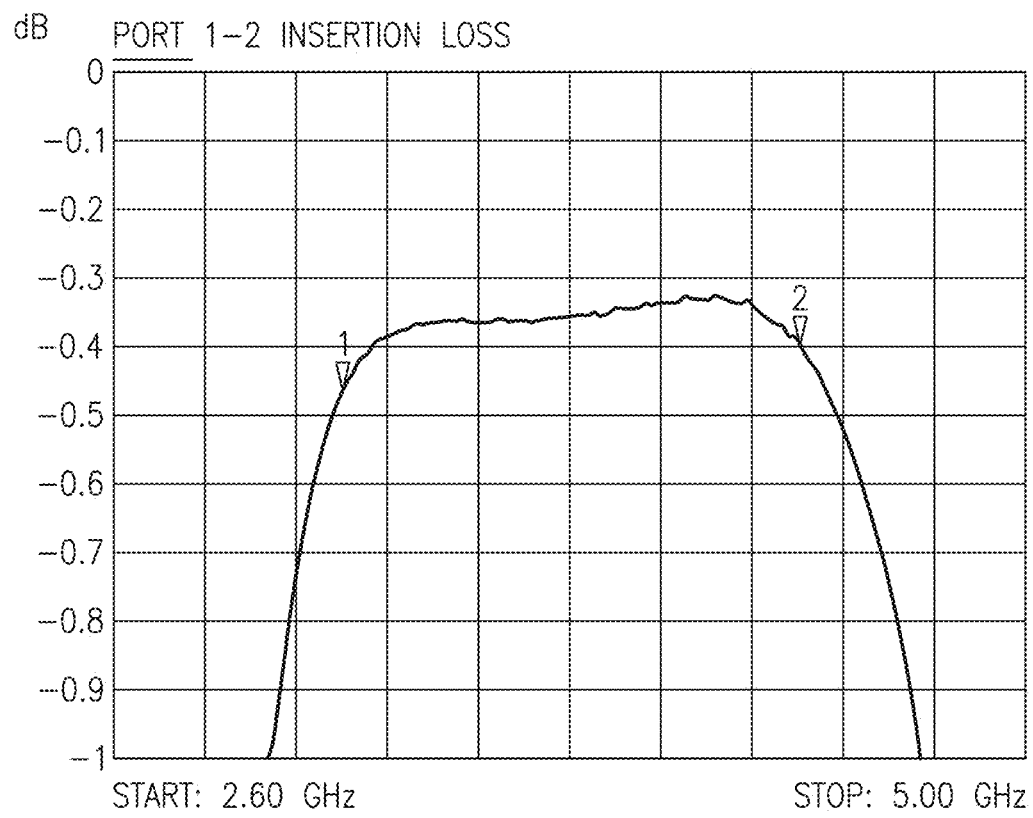
Figure 19B:
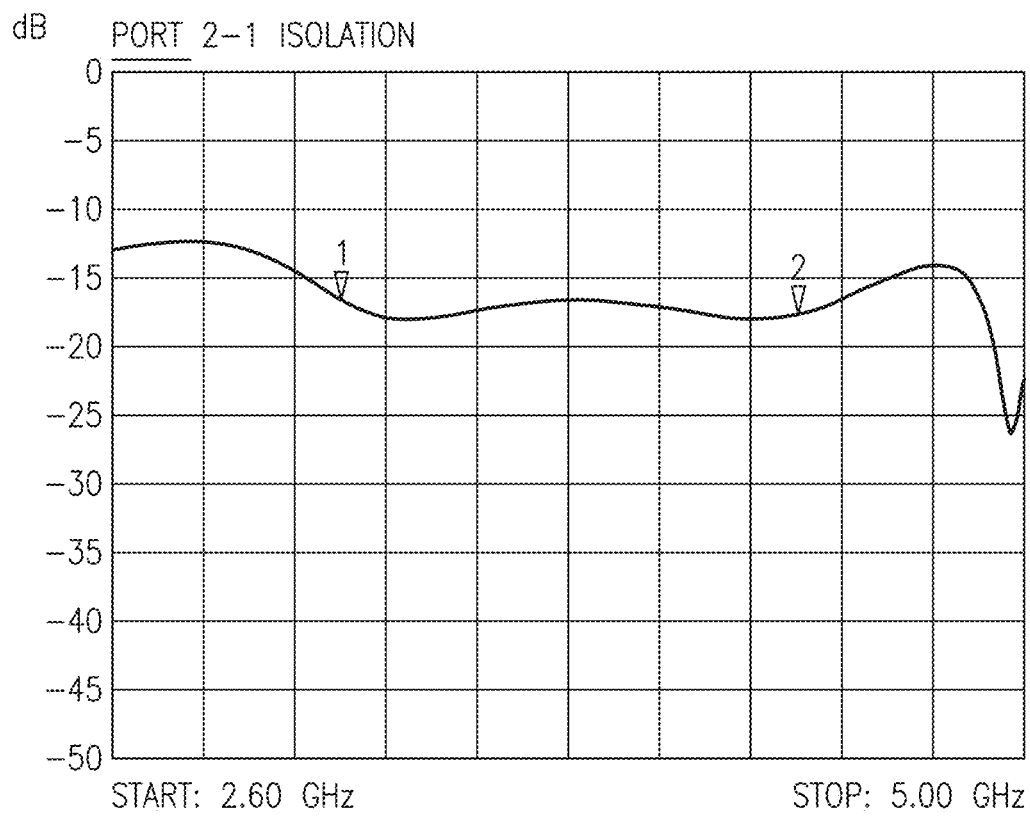
Figure 20A:
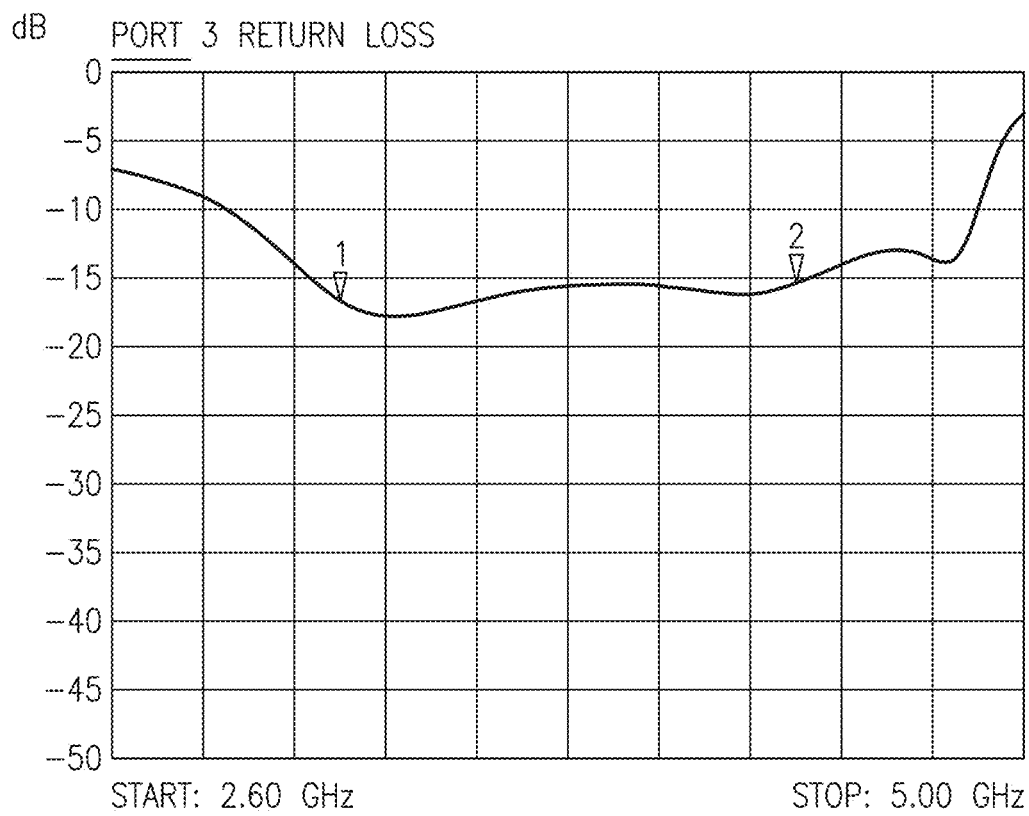
Figure 20B:
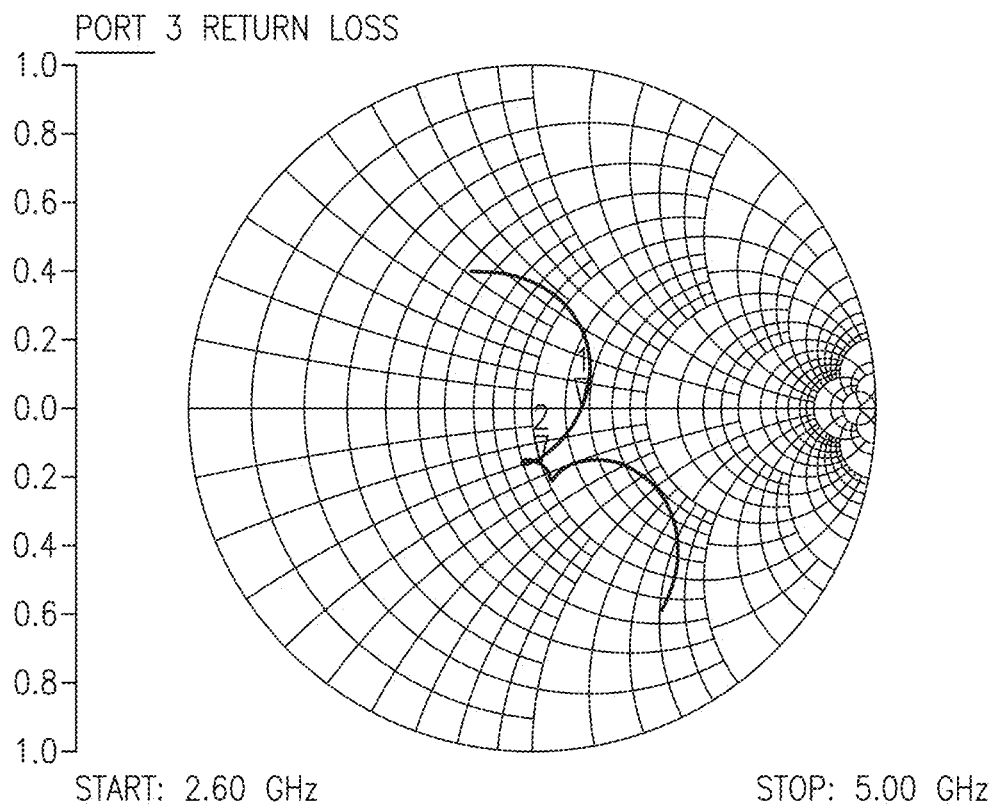

FIG. 17A illustrates return loss at Port 1 in dB (level of power loss due to reflected signal at the input port of the circulator). FIG. 17B illustrates impedance measured at Port 1 (displayed on a Smith Chart). FIG. 18A illustrates a return loss at Port 2 in dB (level of power loss due to reflected signal at the output port of the circulator). FIG. 18B illustrates impedance measured at Port 2 (displayed on a Smith Chart). FIG. 19A illustrates insertion loss of Port 1-2 (level of power loss due to transmission from Port 1 to Port 2). FIG. 19B illustrates isolation of Port 2-1 (level of power loss due to transmission from Port 2 to Port 1). FIG. 20A illustrates return loss at Port 3 in dB (level of power loss due to reflected signal at the input port of the circulator). FIG. 20B illustrates impedance measured at Port 3 (displayed on a Smith Chart). The low forward transmission loss (e.g., insertion loss) and high reverse transmission loss (e.g., isolation) are advantageous parameters of the circulators operation. The low forward transmission loss (e.g., insertion loss) improves the output efficiency of the power amplifier. High reverse transmission loss (e.g., isolation) is an advantageous parameter of circulator operation because of the improved transmit to receive isolation.

From the foregoing description, it will be appreciated that inventive products and approaches for composite microstrip and SIW circulators/isolators are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. An electronic device comprising:
    a circulator, including a dielectric substrate having an aperture, a ferrite disc fit within the aperture in the dielectric substrate, the dielectric substrate and ferrite disc being co-fired together to contain the ferrite disc within the aperture of the dielectric substrate, the circulator further including metallization on the co-fired dielectric substrate and ferrite disc, a first port, and a second port;
    a packaged semiconductor transistor-based amplifier, mounted on the dielectric substrate, connected to the first port of the circulator; and
    a packaged bulk acoustic wave or surface acoustic wave filter, mounted on the dielectric substrate, connected to the second port of the circulator.

2. The electronic device of claim 1 wherein the ferrite disc is an yttrium iron garnet disc.

3. The electronic device of claim 1 wherein the co-firing is at a temperature of at least 1000° C.

4. The electronic device of claim 1 wherein the circulator is configured for use in above 1.8 GHz systems.

5. The electronic device of claim 1 wherein the metallization is circuitry.

6. The electronic device of claim 1 wherein no adhesive is used.

7. The electronic device of claim 1 further comprising a coupler, a switch, and a load located on the dielectric substrate.

8. The electronic device of claim 7 wherein a transmit power amplifier of the packaged semiconductor transistor-based amplifier is coupled to the coupler.

9. The electronic device of claim 7 wherein a receive low noise amplifier of the packaged semiconductor transistor-based amplifier is coupled to the switch.

10. A radio frequency antenna system comprising:
    a circulator including a dielectric substrate having an aperture, a ferrite disc fit within the aperture in the dielectric substrate, the dielectric and ferrite disc being co-fired together to contain the ferrite disc within the aperture of the dielectric substrate, the circulator further including metallization on the co-fired dielectric substrate and ferrite disc, a first port, and a second port;
    a packaged semiconductor transistor-based amplifier, mounted on the dielectric substrate, connected to the first port of the circulator;
    a packaged bulk acoustic wave or surface acoustic wave filter, mounted on the dielectric substrate, connected to the second port of the circulator; and
    an antenna, connected to the packaged bulk acoustic wave or surface acoustic wave filter.

11. The radio frequency antenna system of claim 10 wherein the ferrite disc is an yttrium iron garnet disc.

12. The radio frequency antenna system of claim 10 the co-firing is at a temperature of at least 1000° C.

13. The radio frequency antenna system of claim 10 wherein the system is configured to operate as a 5G system.

14. The radio frequency antenna system of claim 10 wherein no adhesive is used.

15. The radio frequency antenna system of claim 10 wherein the metallization is circuitry.

16. The radio frequency antenna system of claim 10 further comprising a coupler, switch, and load located on the dielectric substrate.

17. The radio frequency antenna system of claim 16 wherein a transmit power amplifier of the packaged semiconductor transistor-based amplifier is coupled to the coupler.

18. The radio frequency antenna system of claim 16 wherein a receive low noise amplifier of the packaged semiconductor transistor-based amplifier is coupled to the switch.

19. A multi-input multi-output system comprising:
    a plurality of front-end modules each including a circulator including a dielectric substrate having an aperture, a ferrite disc fit within the aperture in the dielectric substrate, the dielectric substrate and ferrite disc being co-fired together to contain the ferrite disc within the aperture of the dielectric substrate, the circulator further including metallization on the co-fired dielectric substrate and ferrite disc, a first port, and a second port, each of the plurality of front-end modules further including a packaged semiconductor transistor-based amplifier, mounted on the dielectric substrate, connected to the first port of the circulator, each of the plurality of front-end modules further including a packaged bulk acoustic wave or surface acoustic wave filter, mounted on the dielectric substrate, connected to the second port of the circulator; and a plurality of antennas each coupled to a respective front-end module of the plurality of front-end modules.

20. The multi-input multi-output system of claim 19 wherein the mobile device is configured for use in above 1.8 GHz or above 3 GHz systems.

* * * * *